United States Patent
Shem-Tov et al.

(10) Patent No.: US 12,496,258 B2
(45) Date of Patent: Dec. 16, 2025

(54) VIAL MANIPULATOR FOR USE IN A ROBOTIC PHARMACEUTICAL PREPARATION SYSTEM

(71) Applicant: Equashield Medical Ltd, Migdal Tefen (IL)

(72) Inventors: Eric Shem-Tov, Ramat Hasharon (IL); Roie Taboch, Yokneam Eilit (IL)

(73) Assignee: Equashield Medical Ltd, Migdal Tefen (IL)

( * ) Notice: Subject to any disclaimer, the term of this patent is extended or adjusted under 35 U.S.C. 154(b) by 0 days.

(21) Appl. No.: 18/439,715

(22) Filed: Feb. 12, 2024

(65) Prior Publication Data

US 2024/0269043 A1    Aug. 15, 2024

Related U.S. Application Data

(60) Provisional application No. 63/444,962, filed on Feb. 12, 2023.

(51) Int. Cl.
*A61J 7/00* (2006.01)
*B25J 9/04* (2006.01)
*B25J 15/00* (2006.01)

(52) U.S. Cl.
CPC ............. *A61J 7/0076* (2013.01); *B25J 9/041* (2013.01); *B25J 15/0052* (2013.01)

(58) Field of Classification Search
CPC ........... A61J 1/2055; A61J 1/20; B65B 3/003; G07F 17/0092; G07F 11/165
See application file for complete search history.

(56) References Cited

U.S. PATENT DOCUMENTS

| | | | |
|---|---|---|---|
| 9,804,586 B2 | 10/2017 | Fioravanti et al. | |
| 9,868,553 B2 * | 1/2018 | Matsukuma | B65B 3/003 |
| 11,246,803 B2 | 2/2022 | Zollinger et al. | |
| 2004/0154690 A1 | 8/2004 | Osborne et al. | |
| 2011/0100501 A1 * | 5/2011 | Mizuno | A61J 3/002 141/2 |
| 2013/0197361 A1 | 8/2013 | Kaiser et al. | |

(Continued)

FOREIGN PATENT DOCUMENTS

| | | |
|---|---|---|
| CN | 109011069 A | 12/2018 |
| CN | 111603388 A | 9/2020 |
| CN | 115024973 A | 9/2022 |

(Continued)

*Primary Examiner* — Timothy P. Kelly
(74) *Attorney, Agent, or Firm* — Workman Nydegger

(57) ABSTRACT

A vial manipulator is provided for use in a robotic pharmaceutical preparation system. The vial manipulator includes a manipulator body defining a main axis; a first vial holder pivotably coupled to the manipulator body and configured to receive and hold of a vial assembly; a first pivoting mechanism for pivoting the first vial holder about a first axis extending outwardly from the main body in a first direction; a second vial holder pivotably coupled to the manipulator body and configured to receive and hold of a vial assembly; and a second pivoting mechanism for pivoting the second vial holder about a second axis extending outwardly from the main body in a second direction which is different than the first direction. The vial manipulator can further include a turning mechanism configured for turning the manipulator body about the main axis.

16 Claims, 15 Drawing Sheets

(56) References Cited

U.S. PATENT DOCUMENTS

2015/0210410 A1* 7/2015 Umeno ................ A61J 1/2096
                                                                 53/51
2019/0077022 A1* 3/2019 Murakami ............ A61J 1/2096

FOREIGN PATENT DOCUMENTS

| WO | 2012086144 A1 | 6/2012 |
| WO | 2022188123 A1 | 9/2022 |

* cited by examiner

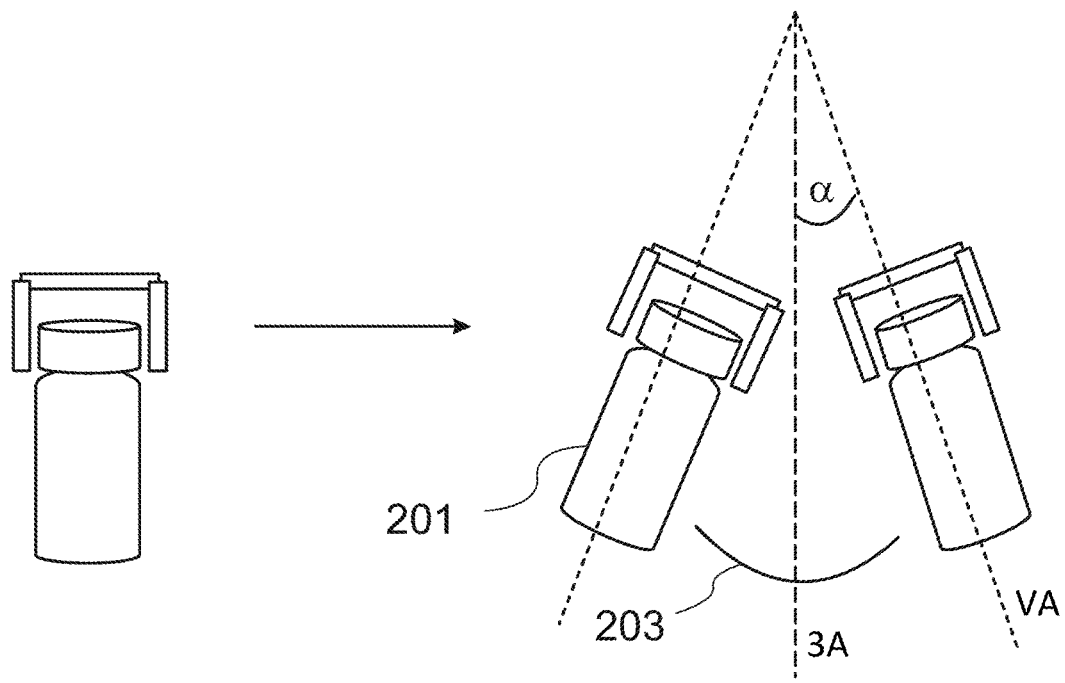
FIG. 2A
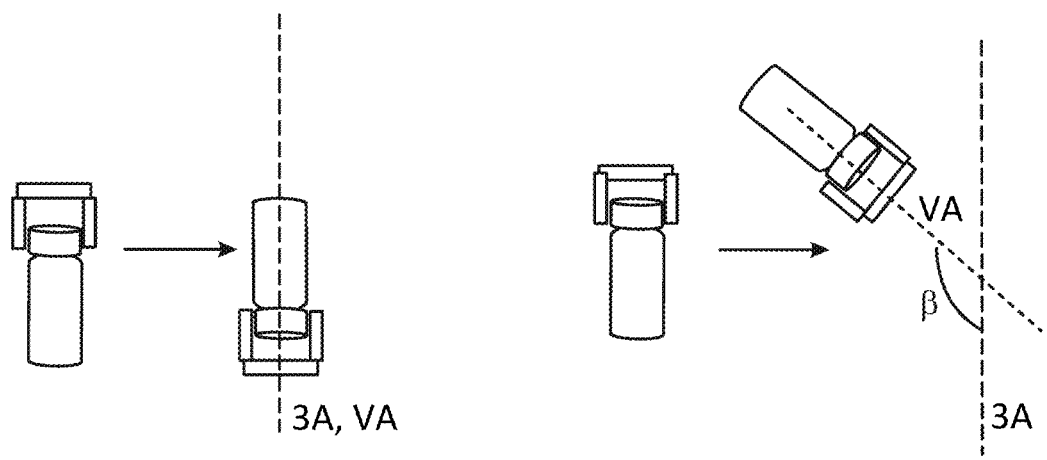
FIG. 2B
FIG. 2C

VIAL MANIPULATOR FOR USE IN A ROBOTIC PHARMACEUTICAL PREPARATION SYSTEM

CROSS-REFERENCE TO RELATED APPLICATIONS

This application claims the benefit of and priority to U.S. Provisional Patent Application Ser. No. 63/444,962, filed on Feb. 12, 2023, which is incorporated herein by reference in its entirety.

TECHNOLOGICAL FIELD

The present application relates to robotic pharmaceutical preparation systems and more particularly to manipulation of containers (e.g. vials) within a robotic pharmaceutical preparation system.

BACKGROUND

U.S. Pat. No. 9,804,586 discloses a "Method of robot control is disclosed that includes the steps of: providing a user interface for introducing data indicative of a drug to be subjected to a reconstitution process; accessing an internal data base for outputting, for a selected drug, a list of primitive movements P1, P2, . . . Pi, . . . Pn to be used in the reconstituting process; operating the robot for executing sequentially the primitives and moving a container according to the instructions of the primitives; measuring, during the movement of the container under robot action, physical positions in the space and dynamic parameters of the container creating a list of registered data; comparing the measured positions in the space and the dynamic parameter with the corresponding ones of the primitive movements for selecting a list of eligible primitives if a sufficient approximation level is reached; elaborating selected eligible primitives together to generate instructions for the robot allowing a complex movement encompassing the simple movements; and using the robot for shaking the container according to the complex movement."

U.S. Pat. No. 11,246,803 discloses "A vial puck configured for attachment to a vial containing a drug is provided. The vial puck includes various features for facilitating uniform control of vials of various sizes in an automatic compounder system. The vial puck features may include a vial recess for receiving a vial of a particular size and securing the vial within the vial recess. The features may also include a cylindrical central portion, perpendicular extensions that extend from a top of the cylindrical central portion, a gear extending from the cylindrical central portion, and a sealing member disposed in the cylindrical central portion. The vial puck may include a cylindrical protrusion configured to press against a septum of the vial to form a seal between the vial puck and the vial. The sealing member may be configured to receive a needle of the compounder system therethrough to allow access to the vial".

SUMMARY AND GENERAL DESCRIPTION

A robotic pharmaceutical preparation system may comprise an automatic or partially automatic system comprising at least one manipulator controlled at least partially by a controller and may further comprise one or more driving assemblies for generating movement of the manipulator, as will be further described hereinbelow.

The robotic pharmaceutical preparation system can be operable for performing any activity related to preparation of drugs, such as drugs designated for administration to patients, including compounding, diluting, reconstituting, transferring, filling, drawing, agitating and/or other processes associated with drug preparation.

In some examples, the robotic pharmaceutical preparation system can be configured for receiving a drug vial; diluting or reconstituting the drug in the vial, as needed; and then obtaining, by drawing from the vial, a defined amount of the drug. Optionally, the drug is then prepared for administration to a patient, for example by transferring the drug into a syringe and/or into an intravenous (IV) bag.

The robotic pharmaceutical preparation system can include one or more fluid transfer module(s), such as fluid drawing modules, diluting modules, and/or other fluid transfer modules. Components of the drug preparation system can be arranged on a platform (e.g. a table, optionally a recessed table, an inner surface of a hood) with at least some of the components being movable with respect to each other and/or with respect to the platform. Movement of components may generally take place along the length and/or width dimensions of the platform and optionally vertically with respect to the platform, such as above the platform, below the platform, or across a thickness of the platform, for example via a recess formed in the platform or across an edge thereof.

The pharmaceutical preparation system may be deployed for preparation of any type of drug, including a hazardous drug which is prepared in closed systems, as well as non-hazardous drugs. In closed fluid transfer systems deployed for preparation of hazardous drugs, measures are taken to prevent hazardous leakage of fluid and/or fume from the containers such as a syringe, a vial, an IV bag or the like. For ensuring alignment and providing a secured coupling during fluid transfer, connectors or adaptors can be used with the containers and/or generally at fluid transfer interfaces of the system. It is to be understood herein that for the purposes of the present description, if and when connectors or adaptors are used with the containers, the combinations are referred to herein as container assembly. For instance, a vial assembly as described herein should be understood herein as a vial and a vial adaptor/connector attached thereto. The manipulator, according to some examples, can be configured to receive, hold and manipulate the container (e.g., vial) alone as well as container assembly (e.g., a vial having a vial adaptor attached thereto).

The present application focuses on a vial manipulator for use in a robotic pharmaceutical preparation system. The manipulator is capable of receiving and holding a plurality of containers, e.g. vials. The manipulator can be configured for selectively manipulating each of the vials so as to pivot the vial into a selected orientation; and/or agitate (e.g. swing) the vial to mix its contents; and/or to hold the vial steady, optionally at a selected orientation, for example so as to enable insertion of fluid into the vial or withdrawal of fluid therefrom. The vial manipulator, according to some embodiments, is further configured for turning with respect to a platform on which it is mounted (e.g. the table of the pharmaceutical preparation system), such that a position of the plurality of vials held by the manipulator is modified by the turning.

According to a first aspect there is provided a vial manipulator for use in a robotic pharmaceutical preparation system, the vial manipulator comprising:
- a manipulator body defining a main axis;
- a first vial holder pivotably coupled to the manipulator body and configured to receive and hold of a vial assembly;
- a first pivoting mechanism for pivoting the first vial holder about a first axis extending outwardly from the main body in a first direction; and
- a second vial holder pivotably coupled to the manipulator body and configured to receive and hold of a vial assembly;
- a second pivoting mechanism for pivoting the second vial holder about a second axis extending outwardly from the main body in a second direction which is different than the first direction.

For the purposes of the present description, the direction of extension of axis of pivoting of a vial holder should be understood as being along a vector originating at the manipulator body and extending towards the respective vial holder. For instance, the first direction in which the first axis of pivoting of the first vial holder extends outwardly from the main body, should be understood as being along a vector originating at the main body and extending towards the first vial holder. Similarly, the second direction in which the second axis of pivoting of the second vial holder extends outwardly from the main body, should be understood as being along a vector originating at the main body and extending towards the second vial holder. Analogously, any direction in which an axis of pivoting of a particular vial holder extends outwardly from the main body, should be understood as being along a vector originating at the main body and extending towards that particular vial holder.

A vial manipulator in which each of the vial holders is operable via its associated pivoting mechanism may provide for selectively manipulating each of the vial assemblies held by the holders. That is, each pivoting mechanism can be configured to pivot the vial holder associated with it or to hold the vial assembly steady, independently of a current state of the other vial holder. Examples of operational states which can be provided by an arrangement as described include holding one vial assembly steady in any orientation while repetitively pivoting (agitating) the other; agitating both vial assemblies in same or different manner independent of each other; holding both vial assemblies steady in any orientations independently of each other; pivoting each of the vials to a selected orientation defined per the vial, for example holding one vial upright and the other one inverted.

It is noted that a vial manipulator may include more than two vial holders, such as 3, 4, 5, 6, 8, 10 or intermediate, larger or smaller number of vial holders. The vial holders can be symmetrically disposed relative to the manipulator body, for example define equal angles between them (e.g. 180 degrees between the vial holders when two vial holders are used, 90 degrees between the vial holders when four vial holders are used, etc.). Alternatively, the vial holders are otherwise disposed with respect to the manipulator body, e.g. non-symmetrically disposed. The vial holders can be independently operable via their associated respective pivoting mechanism, as described above for two vial holders.

Returning to the example of two vial holders, in some embodiments, the first direction and the second direction define an angle of at least 90 degrees between them. Optionally, the first direction and the second direction define an angle of 180 degrees between them, and are directly opposite each other such that the first and second axes are directly aligned. In this arrangement, the vial holders can face away from each other. In an example of a manipulator body having a rounded cross-section profile, the vial holders may diametrically oppose each other. In some embodiments, in which the manipulator body is shaped to define a plurality of external surfaces, each vial holder can extend from a different surface or face of the manipulator body (i.e. of a housing of the manipulator body). Optionally, the surface can be a flat surface.

In some embodiments, the first and second axes about which the first and second vial holders are pivotable can be perpendicular to the main axis. Each of the first and second pivot mechanisms can include a pivot attachment of the respective vial holder to the manipulator body, with each of the first and second axes passing through the respective pivot attachment.

In some embodiments, the vial manipulator can further comprise a turning/rotating mechanism configured for turning/rotating the manipulator body about the main axis. The manipulator body can be mounted on a platform and be rotatable by the turning mechanism relative to the platform. Turning of the manipulator body displaces the vial holders, potentially interchanging their positions or otherwise displacing each of the vial holders. It is to be understood herein that the terms "turning" and "rotating" with respect to the movement of the manipulator body about the main axis have been used interchangeably. In other words, it is to be understood herein that turning the manipulator body about the main axis by the turning mechanism includes rotating the manipulator body about the main axis, and hence turning mechanism has also been referred to as rotating mechanism.

A vial manipulator for example as described herein, which is configured for selectively pivoting each of the vial assemblies held by at the manipulator as well as for turning about the main axis of the manipulator body may reduce or prevent the need to move the vial between different stations or manipulators, which are optionally distanced from each other, since a plurality of processes can take place with the vial being held by a same vial holder, which position can be changed simply by turning of the manipulator body. Such arrangement may reduce or prevent the need to pick up the vial and, for example, transfer the vial to another distanced manipulator or station for further processes.

When a vial (or vial assembly) is held at a vial manipulator for example as described herein, one or more of the following processes can take place without needing to lift and transfer the vial: keeping the vial holder steady for holding the vial at a selected orientation for diluting/reconstituting contents of the vial, pivoting the vial holder for agitating the vial (e.g. by repetitively pivoting the vial holder), keeping the vial holder steady for holding the vial at a selected orientation for drawing fluid from the vial, and the like. Reducing the need for multiple stations or manipulators may contribute to a simpler, more compact system design, potentially having a smaller footprint. Further, performing multiple processes while the vial remains held by the same vial holder may accelerate preparation times and may provide for a higher preparation rate.

Referring now to a vial holder structure, in some embodiments, each of the first and second vial holders can comprise:
- a pivot plate pivotably connected to a wall of the manipulator body at the pivot attachment;
- a frame connected to and extending from the pivot plate, the frame configured to receive and hold the vial assembly;

wherein pivoting of the pivot plate is configured to carry the frame along, thereby changing an orientation of the vial assembly held by the frame.

Optionally, the frame can be fixedly connected to the pivot plate. Optionally, the frame can be at least partially open and comprise a set of clamping arms extending internally to the frame for clamping onto the at least a portion of the vial assembly.

In some examples, the frame can be directly connected to the main body of the manipulator without the pivot plate, thereby constituting the vial holder. In such examples, the connection between the frame and the main body can be any suitable connection to allow pivoting of the frame with respect to the main body. In some examples, the pivot plate can be located inside the main body and only the frame protrudes outside. In some examples, the pivot plate can be located outside the main body.

The at least a portion of the vial assembly which is clamped by the clamping arms may include a top portion of a vial, or an adaptor which is mounted/attached onto a top portion of a vial, with the clamping arms shaped to snap-fit onto the at least a portion of the vial assembly. The clamping arms can be resilient and as such configured to obtain hold of vials and/or vial adapters of different shapes and/or sizes (e.g. having different diameters).

In some embodiments, pivoting of the vial holder changes an orientation of the vial assembly from an initial orientation in which the vial assembly is upright. In an example, the vial assembly can be pivoted to an inverted orientation, and/or to any non-vertical orientation.

In some embodiments, a vial assembly held by any or each of the vial holders can be pivotably moveable on a respective first plane and second plane, each of which intersects and is perpendicular to the first axis and the second axis, respectively, and through which a respective third axis and fourth axis, both being parallel to the main axis, extend; whereby at the initial orientation of the vial assembly held by the vial holder, a longitudinal axis of the respective vial assembly is aligned with the third axis and the fourth axis, respectively.

In some configurations, the pivoting mechanism can be configured to pivot the vial holder to orientate the vial assembly such that the vial assembly's long axis is at any selected angle with respect to the third axis. Alternatively, the pivoting mechanism is configured to pivot the vial holder to orientate the vial assembly only to a plurality of pre-defined angles between the vial assembly's long axis and the third axis, for example a 30 degree angle, a 90 degree angle, a 180 degree angle, or intermediate, larger or smaller number of angles and/or intermediate, larger or smaller extent of angles.

In some embodiments, each of the first and second pivoting mechanisms comprises an actuator for pivoting the vial holder. Alternatively, in some embodiments, a single actuator may be configured to drive both pivoting mechanisms. In the examples having more than two vial holders and corresponding pivoting mechanisms, each pivoting mechanism can comprise a respective actuator for pivoting the corresponding vial holder. In the examples having more than two vial holders and corresponding pivoting mechanisms, all or some of the pivoting mechanism can comprise a single common actuator for pivoting the corresponding vial holders.

The actuator of a pivoting mechanism can be fully contained within a housing of the manipulator body. Alternatively, the actuator can be only partially contained within the housing. Alternatively, the actuator is external to the housing. It is noted that more than actuator can be employed for driving each of the pivoting mechanisms.

In some embodiments, the two actuators of the first and second vial holders are symmetrically arranged side-by-side within the manipulator body housing.

The actuator can comprise a motor, and the respective vial holder which is driven by the actuator can be connected to the motor via shaft bearing. Optionally, the motor can be a servo motor. Pivoting the vial holder by a selected angle can be achieved, for example, by pre-setting an encoder of the servo motor.

In some embodiments, the actuator can be controlled by a controller. The controller can be configured to select and operate each of the first and second vial holders independently according to one or more of the following operational modes:

(a) an agitating mode in which the vial holder is repetitively pivoted, for mixing the contents of a vial held by the vial holder;

(b) an orientation setting mode in which the vial holder is pivoted to set a temporarily fixed orientation of a vial assembly held by the vial holder; and (c) a fluid communication mode in which the vial holder is held steady at the selected orientation so as to allow insertion of fluid into a vial assembly held by the vial holder, or withdrawal of fluid therefrom.

When the controller controls the actuator according to the agitating mode, the controller can repetitively pivot the vial holder such that a long axis of a vial assembly held by the vial holder defines a varying angle smaller than 90 degrees with respect to opposite sides of the third axis or the fourth axis, respectively, for swinging the vial assembly, for example in pendulum-like movement or rotary movement.

When the controller controls the actuator according to the orientation setting mode, the controller can control the actuator to pivot the vial holder such that a long axis of a vial assembly held by the vial holder defines a fixed angle of between 0-180 degrees with respect to the third axis. In an example, at a 180 degree angle, a vial assembly held by the vial holder is inverted.

In some embodiments, the controller can be further configured for controlling the turning mechanism for setting a rotational position of the first and second vial holders. In an example in which the first and second vial holders are opposite each other, turning the manipulator body by 180 degrees can interchange the positions of the first and second holders. Generally, the manipulator body can be turned about the main axis by any selected degree, such as by 30 degrees, 60 degrees, 90 degrees, 270 degrees, 320 degrees or intermediate, larger or smaller degree. Optionally, turning of the manipulator body is according to preset intervals, such as 90 degree intervals, 60 degree intervals, 30 degree intervals or intermediate, larger or smaller intervals. Optionally, the preset intervals are defined according to a number and/or an arrangement of the vial holders on the manipulator body.

The vial manipulator can constitute a part of a robotic pharmaceutical preparation system which further comprises an operational module which is configured to interface with a vial assembly held by the vial manipulator.

In some cases, the operational module can be a reconstitution/dilution module, and the vial manipulator can be spatially arranged with respect to a fluid insertion component of the reconstitution/dilution module such that a vial assembly held by one of the first and second vial holders is aligned beneath the fluid insertion component. In such setup, the controller can be configured to operate the vial holder according to the fluid communication mode during insertion of fluid into the vial assembly via the fluid insertion component.

Similarly, the operational module can be a fluid drawing module, and the vial manipulator can be spatially arranged with respect to a fluid drawing component of the module such that a vial assembly held by one of the first and second vial holders is aligned above the fluid drawing component. In such setup, the controller can be configured to operate the vial holder according to the fluid communication mode during withdrawing of fluid via the fluid withdrawing component.

In another example, the operational module can be an articulable arm, and the vial manipulator can be spatially located such that only one of the first and second vial holders is positioned within a range of reach of the arm, whilst the other vial holder is out of the range of reach. In such arrangement, turning of the vial manipulator can interchange the vial holders positions, placing the vial holder that was out of the range of reach within reach of the arm, and the vial holder that was within reach-out of the range of reach.

In some cases, a plurality of operational modules such as a reconstitution/dilution module, fluid drawing module, articulable arm and others can be configured along with the vial manipulator as part of a same robotic pharmaceutical preparation system.

According to a second aspect there is provided a method of controlling a vial manipulator of a robotic pharmaceutical preparation system, the vial manipulator comprising a manipulator body, and first and second vial holders pivotably connected to the manipulator body, the method comprising:
  selectively pivoting the first vial holder about a first axis extending outwardly from the manipulator body in a first direction; and
  selectively pivoting the second vial holder about a second axis extending outwardly from the manipulator body in a second direction which is different than the first direction.

According to a third aspect there is provided a vial manipulator for use in a robotic pharmaceutical preparation system, the vial manipulator comprising:
  a manipulator body defining a main axis;
  a first vial holder pivotably coupled to the manipulator body and configured to receive and maintain hold of a vial assembly;
  a second vial holder pivotably coupled to the manipulator body and configured to receive and maintain hold of a vial assembly; and
  a turning mechanism configured for turning the manipulator body about the main axis.

According to a fourth aspect there is provided a method of controlling a vial manipulator of a robotic pharmaceutical preparation system, the vial manipulator comprising a manipulator body having a main axis, and first and second vial holders pivotably connected to the manipulator body, the method comprising:
  receiving, at the first and second vial holders, corresponding first and second vial assemblies;
  selectively pivoting at least one of the first and second vial holders; and
  turning the manipulator body about its main axis to change the positions of the first and second vial holders.

Selectively pivoting of the vial holders may comprise repetitively pivoting the first vial holder to agitate the vial assembly held by the first vial holder, while maintaining the second vial holder stationary. Optionally, before turning the manipulator body, fluid is inserted into the second vial assembly held by the second vial holder.

Selectively pivoting of the vial holders may comprise pivoting the first vial holder by 180 degrees from an initial orientation to hold the first vial assembly at an inverted orientation. Optionally, before turning the manipulator body, fluid is drawn from the first vial assembly held by the first vial holder.

According to a fifth aspect there is provided a robotic pharmaceutical preparation system, comprising:
  a vial manipulator comprising:
    a manipulator body defining a main axis;
    a first vial holder pivotably coupled to the manipulator body and configured to receive and maintain hold of a vial assembly;
    a second vial holder pivotably coupled to the manipulator body and configured to receive and maintain hold of a vial assembly; and
    a turning mechanism configured for turning the manipulator body about the main axis; and
  an operational module having an operating region and configured to interface with a vial assembly at the operating region; the turning mechanism being configured to turn the manipulator body for moving one of the first and second vial holders into the operating region and the other of the first and second vial holders out of the operating region.

In some cases, the operational module comprises a fluid insertion component and/or a fluid drawing component. Optionally, the fluid insertion component and/or fluid drawing component comprises a syringe.

In some cases, the operational module comprises an articulable arm having a distal end which is configured to engage a vial assembly. In such case, the operating region can include a region that is within a range of reach of the arm distal end. Optionally, the arm can engage (optionally, lift and/or transfer) only the vial assembly that is currently within its reach (within the operating region), without being able to access the other vial assembly that is external to the operating region. Such arrangement may improve system safety for example by reducing or preventing undesired contact (or other engagement) of the arm with a vial assembly that is currently not intended to be transferred by the arm, for example a vial assembly that is now being agitated, or a vial assembly which is being filled with fluid or from which fluid is being drawn.

According to a sixth aspect there is provided a robotic pharmaceutical preparation system, comprising:
  a vial manipulator comprising:
    a manipulator body;
    a first vial holder configured to receive and maintain hold of a vial assembly,
    the first vial holder being pivotably coupled to the manipulator body; and
    a first pivoting mechanism configured for pivoting the first vial holder;
  an operational module spatially arranged with respect to the first vial holder and configured to hold a fluid communication component for interfacing with the vial assembly;
  wherein the first pivoting mechanism is configured to pivot the first vial holder to assume the following states:
    a first state in which the vial assembly held by the first vial holder is in an upright orientation in which fluid communication is established with the fluid communication component for insertion of fluid by the fluid communication component;
a second state in which the vial assembly held by the first vial holder is in an inverted orientation in which fluid communication is established with the fluid communication component for drawing fluid by the fluid communication component.

The fluid communication component can comprise a syringe. The syringe can be used for injection of fluid into the vial assembly (such as by pushing a plunger of a pre-filled syringe), or for drawing of fluid from the vial assembly (such as by pulling a plunger of the syringe).

The pharmaceutical preparation system can comprise a controller configured to select and operate the vial holder according to one or more of the following operational modes:
(a) an agitating mode in which the vial holder is repetitively pivoted, for mixing the contents of the vial assembly;
(b) an orientation setting mode in which the vial holder is pivoted to set a temporarily fixed orientation of a vial assembly held by the vial holder; and
(c) a fluid communication mode in which the vial holder is held steady in either the first state or the second state.

The vial manipulator can further comprise a second vial holder configured to receive and maintain hold of a vial assembly, the second vial holder being pivotably coupled to the manipulator body; and a second pivoting mechanism configured for pivoting the second vial holder.

The vial manipulator can further comprise a turning mechanism configured to turn the manipulator body about a manipulator body main axis to thereby interchange the positions of the first and second vial holders. In some embodiments, the controller is further configured to instruct the fluid communication component to transfer fluid to the vial assembly while the first vial holder is operated according to fluid communication mode (c).

According to a seventh aspect, there is provided a vial manipulator for use in a robotic pharmaceutical preparation system, the vial manipulator comprising:
a manipulator body defining a main axis;
a first vial holder pivotably coupled to a first face of the manipulator body and configured to receive and maintain hold of a vial assembly;
a second vial holder pivotably coupled to a second face of the manipulator body and configured to receive and maintain hold of a vial assembly; and
a controller configured to select and operate each of said first and second vial holders independently according to one or more of the following operational modes:
(a) an agitating mode in which the vial holder is repetitively pivoted, for mixing the contents of a vial held by the vial holder;
(b) an orientation setting mode in which the vial holder is pivoted to set a temporarily fixed orientation of a vial assembly held by the vial holder; and
(c) a fluid communication mode in which the vial holder is held steady at the selected orientation so as to allow insertion of fluid into a vial assembly held by the vial holder, or withdrawal of fluid therefrom.

In some embodiments, two or more of the operational modes can be carried out sequentially without removing the vial assembly from the vial holder.

In some embodiments, the system further comprises a turning mechanism configured for turning the manipulator body about the main axis, and the controller is further configured to control the turning mechanism and to synchronize the turning with the operational modes.

It is noted that all features described herein with respect to a certain aspect can be applied to any of the other aspects.

As referred to herein, a "vial" may include a closable vessel, formed for example of glass or plastic, and containing a drug in liquid or powder form. The vial can be a single use vial. The vial can be tubular or bottle shaped, having a neck portion in proximity to the vial opening. The vial can be topped with a cap.

As referred to herein, a "vial assembly" may include: a vial alone, or a vial onto which a vial adaptor is mounted. A septum for at least partially sealing access to the vial can be located as part of the vial itself and/or as part of the vial adaptor. The septum may include a membrane, such as a pierceable membrane or a membrane having a closable passageway defined therethrough.

A vial adaptor can be used as part of the vial assembly referred to herein. The vial adaptor may include a device mountable onto a vial, for facilitating transfer of the vial itself (by grasping onto the adaptor instead of grasping the vial) and/or for facilitating fluid transfer into or from the vial. The vial adapter may provide closed access to the contents of the vial. The vial adaptor may be a single use, sterilized device. It is noted that the terms "vial" and "vial assembly" may be alternately used along this application.

As referred to herein, fluid typically comprises a drug, a diluent, saline solution, water or any other fluid used for drug preparation.

As referred to herein, a "syringe assembly" may include a syringe alone (such as a standard syringe), or a syringe with a connector attached thereto. The syringe connector may be coupled to a hub of the syringe. The syringe connector may provide closed access and may facilitate fluid transfer. A septum may be configured as part of or mounted onto the syringe connector, such that upon engagement of the syringe assembly with a vial assembly, the two septa may interface with each other. It is noted that the terms "syringe" and "syringe assembly" may be alternately used along this application.

The above-described aspects and features of the presently disclosed subject matter as well as additional aspects and features are further specified in embodiments of the presently disclosed subject matter presented below.

Combinability of Embodiments and Features

This disclosure provides various examples, embodiments, and features of a vial manipulator for use in a robotic pharmaceutical preparation system, and corresponding systems and methods. Unless expressly stated, or unless such examples, embodiments, and features would be mutually exclusive, the various examples, embodiments, and features disclosed herein should be understood to be combinable with other examples, embodiments, or features described herein.

A more specific description is provided in the Detailed Description whilst the following are non-limiting examples of different enumerated embodiments of the presently disclosed subject matter. It is noted that the listed embodiments and examples below can be combined with other listed embodiments and examples of the embodiments and examples of any, all, or a combination of the any or all the other examples and embodiments.

1. A vial manipulator for use in a robotic pharmaceutical preparation system, the vial manipulator comprising:
a manipulator body defining a main axis;

a first vial holder pivotably coupled to the manipulator body and configured to receive and hold of a vial assembly;

a first pivoting mechanism for pivoting the first vial holder about a first axis extending outwardly from the main body in a first direction;

a second vial holder pivotably coupled to the manipulator body and configured to receive and hold of a vial assembly; and a second pivoting mechanism for pivoting the second vial holder about a second axis extending outwardly from the main body in a second direction which is different than the first direction.

2. The vial manipulator according to embodiment 1, wherein the first direction and the second direction define an angle of at least 90 degrees between them.

3. The vial manipulator according to embodiment 1 or embodiment 2, wherein the first direction and the second direction define an angle of 180 degrees between them, and are directly opposite each other such that the first and second axes are directly aligned.

4. The vial manipulator according to any one of the preceding embodiments, wherein the first and second axes are perpendicular to the main axis.

5. The vial manipulator according to any one of the preceding embodiments, wherein each of the first and second pivot mechanisms comprises a pivot attachment of the respective vial holder to the manipulator body, with the respective first and second axes passing therethrough.

6. The vial manipulator according to embodiment 5, wherein each of the first and second vial holders comprises:

a pivot plate pivotably connected to a wall of the manipulator body at the pivot attachment;

a frame connected to and extending from the pivot plate, the frame configured to receive and hold the vial assembly;

wherein pivoting of the pivot plate is configured to carry the frame along, thereby changing an orientation of the vial assembly held by the frame.

7. The vial manipulator according to embodiment 6, wherein the frame is fixedly connected to the pivot plate.

8. The vial manipulator according to embodiment 6 or embodiment 7, wherein the frame is at least partially open and comprises a set of clamping arms extending internally to the frame for clamping onto the at least a portion of the vial assembly.

9. The vial manipulator according to embodiment 8, wherein the at least a portion of the vial assembly comprises a top portion of a vial or an adaptor which is mounted onto a top portion of a vial, the clamping arms shaped to snap-fit onto the at least a portion of the vial assembly.

10. The vial manipulator according to any one of the preceding embodiments, further comprising a turning mechanism configured for turning the manipulator body about the main axis.

11. The vial manipulator according to embodiment 10, wherein the manipulator body is mounted on a platform and is rotatable by the turning mechanism relative to the platform.

12. The vial manipulator according to any one of the preceding embodiments, wherein pivoting of the vial holder is configured to change an orientation of the vial assembly from an initial orientation in which the vial assembly is upright.

13. The vial manipulator according to embodiment 12, wherein a vial assembly held by each of the vial holders is pivotably moveable on a respective first plane and second plane, each of which intersects and is perpendicular to the first axis and the second axis, respectively, and through which a respective third axis and fourth axis, both being parallel to the main axis, extend; whereby at the initial orientation of the vial assembly held by the vial holder, a longitudinal axis of the respective vial assembly is aligned with the third axis and the fourth axis, respectively.

14. The vial manipulator according to any one of the preceding embodiments, wherein each of the first and second pivoting mechanisms comprises a respective actuator for pivotably moving the vial holder.

15. The vial manipulator according to embodiment 14, wherein the actuator is fully contained within a housing of the manipulator body.

16. The vial manipulator according to embodiment 15, wherein actuators of the first and second vial holders are symmetrically arranged side-by-side within said housing.

17. The vial manipulator according to any one of embodiments 14-16, wherein the actuators are controlled by a controller.

18. The vial manipulator according to any one of embodiments 14-17, wherein each actuator comprises a motor and the respective vial holder is connected to the motor via a shaft bearing.

19. The vial manipulator according to embodiment 17, wherein the controller is configured to select and operate each of said first and second vial holders independently according to one or more of the following operational modes:

(a) an agitating mode in which the vial holder is repetitively pivoted, for mixing a content of a vial assembly held by the vial holder;

(b) an orientation setting mode in which the vial holder is pivoted to set a temporarily fixed orientation of a vial assembly held by the vial holder; and (c) a fluid communication mode in which the vial holder is held steady at the selected orientation so as to allow insertion of fluid into a vial assembly held by the vial holder, or withdrawal of fluid therefrom.

20. The vial manipulator according to embodiment 19, wherein the controller is configured to operate each of said first and second vial holders according to all operational modes (a)-(c).

21. The vial manipulator according to embodiment 19 when dependent on embodiment 13 and when the controller operates the vial holder according to the agitating mode (a), by repetitively pivoting the vial holder such that a longitudinal axis of a vial assembly held by the vial holder defines a varying angle smaller than 90 degrees with respect to opposite sides of the third axis or the fourth axis, respectively, for swinging the vial assembly in pendulum-like movement.

22. The vial manipulator according to embodiment 19 when dependent on embodiment 13, and when the controller operates the vial holder according to the orientation setting mode (b), by pivoting the vial holder such that a longitudinal axis of a vial assembly held by the vial holder defines a fixed angle of between 0-180 degrees with respect to the third axis or with respect to the fourth axis, respectively.

23. The vial manipulator according to embodiment 22, wherein pivotal movement of the vial assembly at the orientation setting mode (b) is configured to invert the vial assembly by an angle of 180 degrees.

24. The vial manipulator according to embodiment 17 when dependent on embodiment 10, wherein the controller is further configured for controlling the turning mechanism for setting a rotational position of the first and second vial holders.

25. The vial manipulator according to embodiment 17, wherein the vial manipulator constitutes a part of a robotic pharmaceutical preparation system which further comprises an operational module which is configured to interface with a vial assembly held by the vial manipulator, and the controller is further configured to control the operational module.

26. The vial manipulator according to embodiment 25, wherein the operational module is a reconstitution/dilution module which comprises a fluid insertion component, the vial manipulator being spatially arranged with respect to the fluid insertion component such that a respective vial assembly held by one of the first and second vial holders is positioned beneath the fluid insertion component.

27. The vial manipulator according to embodiment 26 when dependent on embodiment 19, wherein the controller is configured to operate the vial holder according to the fluid communication mode (c) for introducing fluid into the vial assembly via the fluid insertion component.

28. The vial manipulator according to embodiment 25, wherein the operational module comprises a fluid drawing module which comprises a fluid drawing component, the vial manipulator being spatially arranged with respect to the fluid drawing component such that a vial assembly held by one of the first and second vial holders is positioned above the fluid drawing component.

29. The vial manipulator according to embodiment 28 when dependent on embodiment 19, wherein the controller is configured to operate the vial holder according to the fluid communication mode (c) for withdrawing fluid via the fluid withdrawing component.

30. The vial manipulator according to embodiment 25, wherein the operational module comprises an articulable arm, the vial manipulator being spatially located such that only one of the first and second vial holders is positioned within a range of reach of the arm, whilst the other vial holder is out of the range of reach.

31. A method of controlling a vial manipulator of a robotic pharmaceutical preparation system, the vial manipulator comprising a manipulator body, and first and second vial holders pivotably connected to the manipulator body, the method comprising:
selectively pivoting the first vial holder about a first axis extending outwardly from the manipulator body in a first direction; and
selectively pivoting the second vial holder about a second axis extending outwardly from the manipulator body in a second direction which is different than the first direction.

32. The method according to embodiment 31, wherein the first direction and the second direction define an angle of at least 90 degrees between them.

33. The method according to embodiment 31 or embodiment 32, wherein the first direction and the second direction define an angle of 180 degrees between them, and are directly opposite each other such that the first and second axes are directly aligned.

34. The method according to any one of embodiments 31-33, wherein the first and second axes are perpendicular to the main axis.

35. The method according to any one of embodiments 31-34, wherein each of the first and second vial holders comprises a pivot plate pivotably connected to a wall of the manipulator body, and a frame connected to and extending from the pivot plate, the frame configured to receive and hold the vial assembly; wherein said selectively pivoting comprises pivoting the pivot plate while carrying the frame along, thereby changing an orientation of the vial assembly held by the frame.

36. A vial manipulator for use in a robotic pharmaceutical preparation system, the vial manipulator comprising:
a manipulator body defining a main axis;
a first vial holder pivotably coupled to the manipulator body and configured to receive and maintain hold of a vial assembly;
a second vial holder pivotably coupled to the manipulator body and configured to receive and maintain hold of a vial assembly; and
a turning mechanism configured for turning the manipulator body about the main axis.

37. The vial manipulator according to embodiment 36, further comprising a first pivoting mechanism for pivoting the first vial holder about a first axis extending outwardly from the main body in a first direction; and a second pivoting mechanism for pivoting the second vial holder about a second axis extending outwardly from the main body in a second direction.

38. The vial manipulator according to embodiment 37, wherein the first and second axes are perpendicular to the main axis.

39. The vial manipulator according to any one of embodiments 36-38, wherein each of the first and second vial holders comprises:
a pivot plate pivotably connected to a side wall of the manipulator body;
a frame connected to and extending from the pivot plate, the frame configured to receive and hold the vial assembly;
wherein pivoting of the pivot plate moves the frame to at least partially change an orientation of the vial assembly held by the frame.

40. The vial manipulator according to any one of embodiments 36-39, wherein a vial assembly held by each of the vial holders is moveable on first and second planes which intersect the first axis or the second axis, respectively, and through which a third axis and a fourth axis, both parallel to the main axis, extend; each of the third axis and fourth axis being perpendicular to the first axis and second axis, respectively; whereby at the initial orientation of the vial assembly held by each of the vial holders, a long axis of the vial assembly is aligned with the third axis and fourth axis, respectively.

41. The vial manipulator according to any one of embodiments 36-40, wherein each of the first and second pivoting mechanisms comprises an actuator for pivoting the vial holder.

42. The vial manipulator according to embodiment 41, wherein the actuator is controlled by a controller.

43. The vial manipulator according to embodiment 42, wherein the controller is configured to select and operate each of said first and second vial holders independently according to one or more of the following operational modes:
  (a) an agitating mode in which the vial holder is repetitively pivoted, for mixing a content of a vial assembly held by the vial holder;
  (b) an orientation setting mode in which the vial holder is pivoted to set a temporarily fixed orientation of a vial assembly held by the vial holder; and
  (c) a fluid communication mode in which the vial holder is held steady at the selected orientation so as to allow insertion of fluid into a vial assembly held by the vial holder, or withdrawal of fluid therefrom.

44. The vial manipulator according to embodiment 42, wherein the controller is further configured for controlling the turning mechanism for setting a rotational position of the first and second vial holders.

45. A method of controlling a vial manipulator of a robotic pharmaceutical preparation system, the vial manipulator comprising a manipulator body having a main axis, and first and second vial holders pivotably connected to the manipulator body, the method comprising:
  receiving, at the first and second vial holders, corresponding first and second vial assemblies;
  selectively pivoting at least one of the first and second vial holders; and
  turning the manipulator body about its main axis to change the positions of the first and second vial holders.

46. The method according to embodiment 45, wherein selectively pivoting comprises repetitively pivoting the first vial holder to agitate the vial assembly held by the first vial holder, while maintaining the second vial holder stationary.

47. The method according to embodiment 46, further comprising, before turning the manipulator body, inserting fluid into the second vial assembly held by the second vial holder.

48. The method according to embodiment 45, wherein selectively pivoting comprises pivoting the first vial holder by 180 degrees from an initial orientation to hold the first vial assembly at an inverted orientation.

49. The method according to embodiment 48, further comprising, before turning the manipulator body, drawing fluid from the first vial assembly held by the first vial holder.

50. A robotic pharmaceutical preparation system, comprising:
  a vial manipulator comprising:
    a manipulator body defining a main axis;
    a first vial holder pivotably coupled to the manipulator body and configured to receive and maintain hold of a vial assembly;
    a second vial holder pivotably coupled to the manipulator body and configured to receive and maintain hold of a vial assembly; and
    a turning mechanism configured for turning the manipulator body about the main axis; and
  an operational module having an operating region and configured to interface with a vial assembly at the operating region; said turning mechanism being configured to turn the manipulator body for moving one of the first and second vial holders into the operating region and the other of the first and second vial holders out of the operating region.

51. The system according to embodiment 50, wherein the operational module comprises a fluid insertion component and/or a fluid drawing component.

52. The system according to embodiment 51, wherein the fluid insertion component and/or fluid drawing component comprises a syringe.

53. The system according to embodiment 50, wherein the operational module comprises an articulable arm having a distal end which is configured to engage a vial assembly.

54. The system according to embodiment 53, wherein the operating region constitutes a region that is within a range of reach of the arm distal end.

55. A robotic pharmaceutical preparation system, comprising:
  a vial manipulator comprising:
    a manipulator body;
    a first vial holder configured to receive and maintain hold of a vial assembly,
    the first vial holder being pivotably coupled to the manipulator body; and
  a first pivoting mechanism configured for pivoting the first vial holder; and an operational module spatially arranged with respect to said first vial holder and configured to hold a fluid communication component for interfacing with the vial assembly;
    wherein the first pivoting mechanism is configured to pivot the first vial holder to assume the following states:
      a first state in which the vial assembly held by the first vial holder is in an upright orientation in which fluid communication is established with the fluid communication component for insertion of fluid by the fluid communication component;
      a second state in which the vial assembly held by the first vial holder is in an inverted orientation in which fluid communication is established with the fluid communication component for drawing fluid by the fluid communication component.

56. The system according to embodiment 55, wherein the fluid communication component comprises a syringe.

57. The system according to embodiment 55 or embodiment 56, comprising a controller configured to select and operate the first vial holder according to one or more of the following operational modes:
  (a) an agitating mode in which the vial holder is repetitively pivoted, for mixing the contents of the vial assembly;
  (b) an orientation setting mode in which the vial holder is pivoted to set a temporarily fixed orientation of a vial assembly held by the vial holder; and
  (c) a fluid communication mode in which the vial holder is held steady in either the first state or the second state.

58. The system according to any one of embodiments 55-57, further comprising:
  a second vial holder configured to receive and maintain hold of a vial assembly, the second vial holder being pivotably coupled to the manipulator body; and
  a second pivoting mechanism configured for pivoting the second vial holder.

59. The system according to embodiment 58, further comprising a turning mechanism configured to turn the manipulator body about a manipulator body main axis to thereby interchange the positions of the first and second vial holders.

60. A vial manipulator for use in a robotic pharmaceutical preparation system, the vial manipulator comprising:
   a manipulator body defining a main axis;
   a first vial holder pivotably coupled to a first face of the manipulator body and configured to receive and maintain hold of a vial assembly;
   a second vial holder pivotably coupled to a second face of the manipulator body and configured to receive and maintain hold of a vial assembly; and
   a controller configured to select and operate each of said first and second vial holders independently according to one or more of the following operational modes:
      a. an agitating mode in which the vial holder is repetitively pivoted, for mixing the contents of a vial held by the vial holder;
      b. an orientation setting mode in which the vial holder is pivoted to set a temporarily fixed orientation of a vial assembly held by the vial holder; and
      c. a fluid communication mode in which the vial holder is held steady at the selected orientation so as to allow insertion of fluid into a vial assembly held by the vial holder, or withdrawal of fluid therefrom.

61. The vial manipulator according to embodiment 60, wherein two or more of the operational modes can be carried out sequentially without removing the vial assembly from the vial holder.

62. The vial manipulator according to embodiment 60 or 61, further comprising a turning mechanism configured for turning the manipulator body about the main axis, wherein the controller is further configured to control the turning mechanism and to synchronize the turning with the operational modes.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which:

FIGS. 2A-C are schematic illustrations of pivot movement of a vial assembly held by a vial holder, according to embodiments of the presently disclosed subject matter;

DETAILED DESCRIPTION OF EMBODIMENTS

Figure 1:
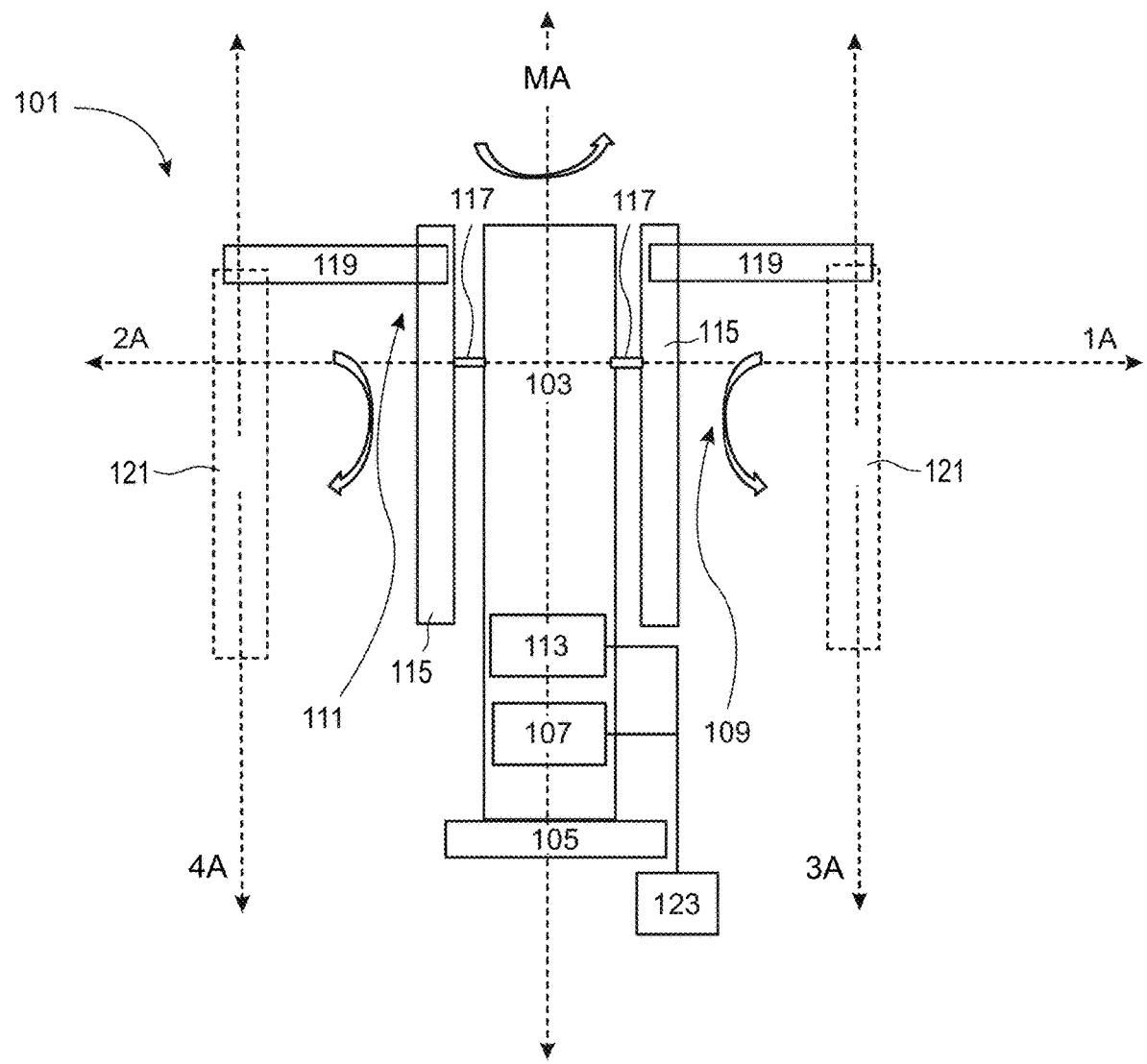
FIG. 1 is a schematic diagram of a vial manipulator, according to an embodiment of the presently disclosed subject matter.

Reference is made to FIG. 1, which is a schematic diagram of a vial manipulator, according to an embodiment of the presently disclosed subject matter;

In an example as shown, a vial manipulator 101 comprises a manipulator body 103 having a main axis MA. In some embodiments, body 103 is elongate and its length may correspond to a height of a vial assembly (e.g. as measured from a bottom of the vial to an uppermost surface of the vial assembly). In an example, body 103 can be at least as long as a vial assembly. In some examples, the dimensions of the body 103 can be independent of the vial assembly. The manipulator body can be cylindrical or generally have a rounded profile, or instead be rectangular, squared, triangular, or generally have a polygonal profile which defines a plurality of faces.

As further shown, manipulator body 103 is rotatably mounted on a platform 105. A turning mechanism 107, for example comprising at least one actuator (e.g. a motor, not shown) is configured to turn the manipulator body relative to the platform about the manipulator body main axis.

A plurality of vial holders are connected to the manipulator body, with each vial holder being configured to receive and hold a vial assembly. In the example shown, two vial holders 109, 111 are connected to the manipulator body. It is noted that the number of vial holders connected to and extending from the manipulator body can range between 1-4 vial holders, 1-10 vial holders, 2-4 vial holders, 2-6 vial holders, or intermediate, larger or smaller number.

Each of the vial holders is pivotable about its own pivoting axis by a pivoting mechanism 113, which includes one or more actuators, e.g. motors. As shown, vial holder 109 is pivotable about a first axis, 1A, which extends outwardly from the manipulator body in a first direction; and vial holder 111 is pivotable about a second axis, 2A, which extends outwardly from the manipulator body in a second direction which is different than the direction of axis 1A. In some embodiments, axes 1A and 2A are perpendicular to the main axis MA. It is to be understood herein that for the purposes of the present description, the first axis 1A is to be understood as extending along a vector originating at the main body 103 and extending towards the first vial holder 109, and the second axis 2A is to be understood as extending along a vector originating at the main body 103 and extending towards the second vial holder 111. In general, an axis of pivoting of a vial holder is to be understood herein as extending along a vector originating at the main body and extending towards that vial holder.

In some embodiments, each of the vial holders extends from a different face of a housing of the manipulator body. In a specific embodiment, shown in this figure, the vial holders are directly opposite each other with respect to the manipulator body, facing opposite directions such that their pivot axes 1A and 2A are directly aligned.

In other embodiments, two or more vial holders can extend from the same face of the manipulator body housing.

In the illustrated example, each of the vial holders comprises a pivot plate 115 which is coupled by a pivot attachment 117 to the manipulator body. The respective pivot axis of each of the vial holders (axes 1A, 2A) passes through the pivot attachment. It is noted that a structure of the pivot attachment is not limited to a pivot plate, and other elements which allow for pivoting of the vial holder and are shaped not to interfere with the vial assembly, also during its pivoting movement, can be used.

In the illustrated example, each of the vial holders includes a frame 119 connected to the pivot plate and extending therefrom, the frame configured for holding a vial assembly 121. In some embodiments, the frame can be fixedly connected to the pivot plate so that pivoting of the plate moves the frame along, thereby moving the vial assembly that is held by the frame. In some embodiments, the frame can be rotatably connected to the pivot plate. The frame can be generally constructed to hold a vial assembly at any portion of the assembly, holding onto either the vial itself (e.g. at a neck portion, at an opening portion) or onto a vial adaptor that is mounted onto the vial.

It is to be understood herein that although the vial holders have been illustrated herein as being constituted by pivot plate and frame, in some examples, any or some or all of the vial holders can be constituted by only a frame pivotably mounted directly to the main body. In some examples, the pivot plate can be located within the main body and the frame can extend outwardly therefrom. In general, the vial holder can have any structure suitable to pivot the vial assembly held therewithin.

At an initial orientation, defined herewith for the purpose of explanation, the vial assembly 121 held by the holder extends along a third axis 3A (for the vial holder 109) or a fourth axis 4A (for the vial holder 111), in an upright orientation in which the top of the vial (or the adaptor mounted thereon) is located vertically above the bottom of the vial.

Each of the vial holders is configured to hold and move the vial assembly along a respective plane that intersects the pivot axis of the respective holder (axis 1A or 2A), with axis 3A and 4A respectively extending within the respective plane.

Control of movement of each of the vial holders and of turning of the manipulator body is provided by at least one controller 123. Controller 123 can be programmed to control pivoting mechanism 113 as well as turning mechanism 107 and to synchronize their operation.

In an exemplary use of the vial manipulator, the controller is configured to operate the pivoting mechanism to have the corresponding vial holder assume one of the following operational modes:

a. an agitating mode, in which the vial holder is repetitively pivoted to agitate the vial assembly so that its contents (e.g. powder and fluid (such as saline), two or more types of fluids, etc.) will be mixed. Optionally, agitating is performed in swinging or pendulum-like or rotary or arcuate movement of the vial holder. Parameters of agitating such as a duration of agitating, a degree of swinging movement, a speed of movement, and/or others may be selected according to the specific drug type to be mixed, such as according to prescription instructions. In some embodiments, a vial holder is pivoted such that a vial assembly held therewithin is agitated until no or only a small amount of drug powder particles remain visible.

b. an orientation setting mode, in which the vial holder is pivoted about its pivoting axis, to set an orientation of the vial holder and thereby the corresponding vial assembly. In an example, the vial holder is pivoted by 180 degrees from the initial orientation to invert the vial assembly. An orientation of the vial assembly can be set with respect to axis 3A such that a long axis of the vial assembly, which at the initial position (a 0 degrees pivot angle) and at the inverted position (a 180 degree pivot angle) is aligned along axis 3A, defines an angle α with respect to axis 3A. (In a similar manner, the second vial assembly is oriented with respect to axis 4A).

c. a fluid communication mode, in which the vial holder is held steady, maintaining the corresponding vial assembly at a selected orientation, for enabling transferring of fluid to or from the vial. At the fluid communication mode, optionally by turning of the manipulator body about the main axis, the vial holder can be brought to a position in which the vial assembly is aligned (e.g. vertically aligned, horizontally aligned, diagonally aligned) with a fluid insertion component or a fluid withdrawal component of the pharmaceutical preparation system, enabling the transfer of fluid between the two.

It is noted that the at least one controller can be configured to control each of the vial holders independently of the other vial holders, selecting an operational mode per the specific vial holder. The controller can be configured to take into account a current operational mode of one of the vial holders, and to set an operational mode of the other vial holder accordingly. The controller can further be configured to define a timing and/or an extent and/or a speed of turning of the manipulator body about the main axis, optionally in correlation with the operational mode(s) of the vial holder(s).

Examples of operation schemes of a vial manipulator which includes, for example, two vial holders, are provided as follows:

Agitating the first vial holder and holding the second vial holder steady in any orientation;

Agitating both vial holders;

Holding both vial holders steady, in same or different orientations with respect to each other;

Agitating the first vial holder, holding the second vial holder steady, then turning the manipulator body to interchange the positions of the two vial holders;

Turning the manipulator body independently of whether one or more of the vial holders is steady in any orientation or is being agitated.

FIGS. 2A-C are schematic illustrations of pivot movement of a vial assembly held by a vial holder, according to embodiments of the presently disclosed subject matter. It is to be understood herein that the schematic illustrations of the vial assembly in FIGS. 2A-C can include only a vial or a vial having an adaptor mounted thereto.

In FIG. 2A, a vial holder (not shown) is pivoted such that a corresponding vial assembly 201 is pivoted with respect to axis 3A, optionally repetitively and along an arc 203, for example, the long axis or vial assembly axis VA pivots along the arc 203, for agitating the vial. An angle α formed between a long axis (vial assembly axis VA) of the vial assembly 201 and axis 3A may range between, for example, 1-90 degrees on each side of axis 3A.

In FIG. 2B, a vial holder (not shown) is pivoted such that the corresponding vial assembly is pivoted from its initial upright orientation to an inverted, upside down orientation, with the vial assembly axis VA being aligned with axis 3A. Optionally, the vial assembly is maintained over time at the inverted orientation, for example for allowing fluid communication to take place.

In FIG. 2C, the vial assembly is pivoted from its initial upright orientation to a pivoted orientation, in which it is optionally held steady (over time), with the vial assembly axis VA defining an angle β with respect to axis 3A. Angle β may range between, for example, 1-179 degrees.

FIGS. 3A-D are schematic illustrations of arrangements of vial holders coupled to a body of a vial manipulator, according to embodiments of the presently disclosed subject matter.

A vial manipulator for example as described herein may include a plurality of vial holders 301 connected to and extending from the manipulator body 303. Each of the vial holders is pivotable about an axis 305 which extends from the manipulator body in a direction different than that of the pivot axes of the other vial holder(s).

Figure 3A:
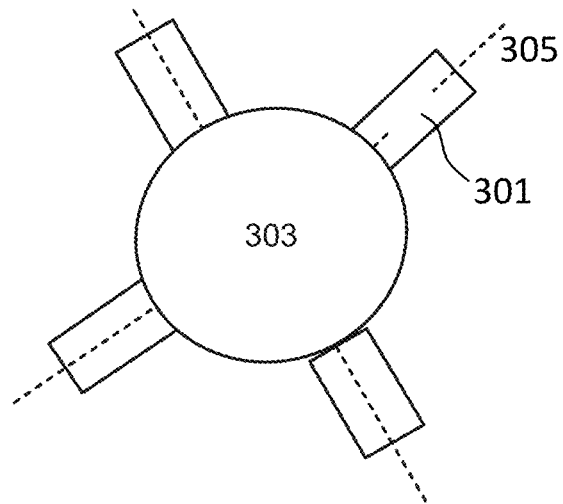
FIGS. 3A-D are schematic illustrations of arrangements of vial holders coupled to a body of a vial manipulator, according to embodiments of the presently disclosed subject matter.
Figure 3C:
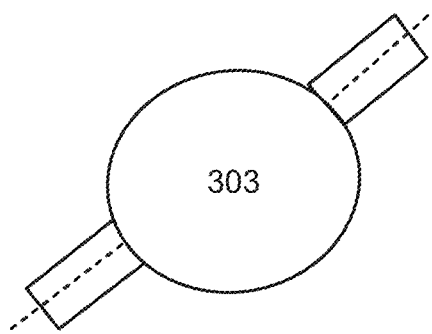
Figure 3B:
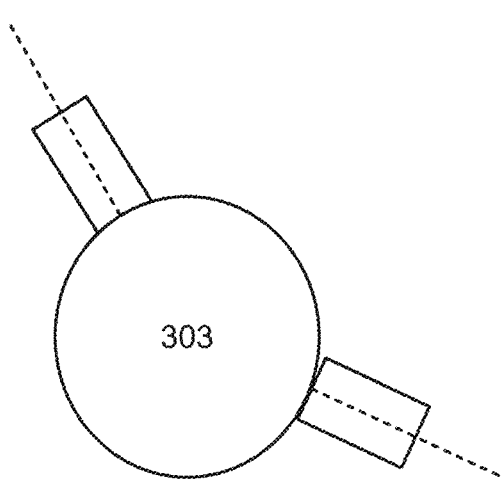
Figure 3D:
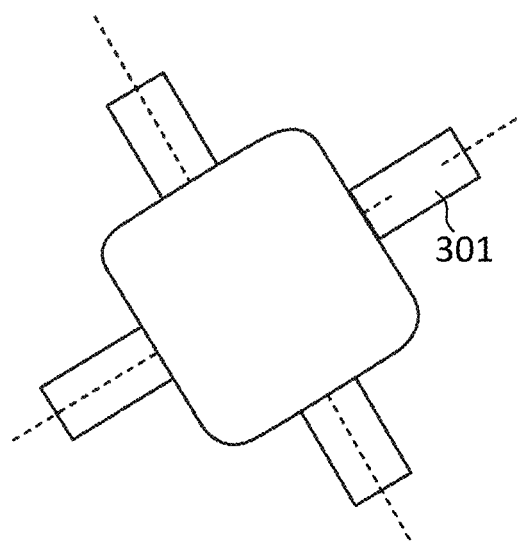

In the example of FIGS. 3A and 3D, four vial holders are connected to the manipulator body and extend in different directions (for example, a frame of each vial holder extends radially outwardly in a different direction than the frames of the other vial holders). Optionally, the four vial holders can be symmetrically arranged with an angle of 90 degrees between adjacent vial holders.

In the example of FIG. 3B, two vial holders are connected to the manipulator body and extend in different directions.

In the example of FIG. 3C, two vial holders are connected to the manipulator body and extend in opposite directions, directly across the manipulator body. In the case of a cylindrical (or other circular profile) manipulator body, the two vial holders can diametrically oppose each other.

It is noted that the manipulator body is shown herein with a rounded profile in FIG. 3A-C (e.g. a circular profile, an elliptic profile), but other manipulator body profiles are also to be contemplated, including polygonal profiles or even arbitrary profiles, for example as shown in FIG. 3D.

Figure 4:
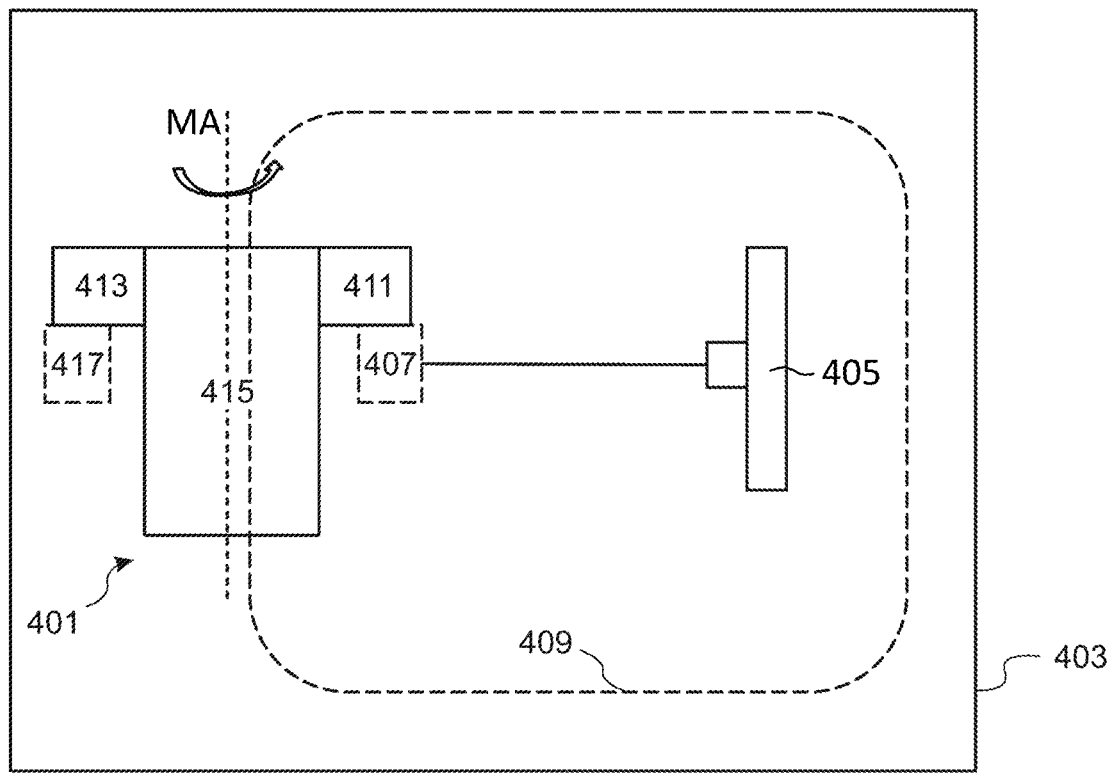
FIG. 4 is a schematic diagram of a spatial arrangement of an operational module and a vial manipulator in a pharmaceutical preparation system, according to embodiments of the presently disclosed subject matter.

FIG. 4 is a schematic diagram of a spatial arrangement of an operational module and a vial manipulator in a pharmaceutical preparation system, according to embodiments of the presently disclosed subject matter.

In this figure, a vial manipulator 401 for example as described elsewhere in this application is shown as part of a pharmaceutical preparation system 403 which comprises at least one operational module 405 configured for interfacing, directly or indirectly, with a vial assembly 407 held by the vial manipulator.

Some examples of an operational module 405 include:

a fluid communication module, for example, a module configured for insertion of fluid into the vial, or a module configured for drawing fluid out of the vial. In some embodiments, the fluid communication module includes a syringe with a needle that is advanceable at least partially into the vial assembly, for injecting fluid into the vial and/or for drawing fluid from the vial. Optionally, the syringe is in fluid communication with a fluid container, such as an IV bag. The syringe can be connected to the IV bag via a selective connector such as a valve (e.g. a one way valve, a two way valve, a three way valve), a stopcock, a selector, or other connector.

an arm (e.g. an articulable robotic arm) or other moving element configured for engaging the vial assembly and optionally lifting the vial assembly. The arm may be capable of transferring a vial assembly, for example, removing a vial assembly from the vial manipulator and/or bringing a vial assembly to the vial manipulator.

an imager, e.g. a camera, which can image the vial assembly, for example for the purpose of determining/verifying the type of drug, verifying the amount of fluid in the vial, checking for presence of particles in the vial, verifying drug information such as from a prescription tag or sticker, and the like.

an attachment/removal unit which can, for example, mount or remove a connector or an adaptor onto the vial.

a labeling unit which can label the vial or otherwise mark the vial, for example according to the vial contents.

In some embodiments, the operational module 405 operates within a defined zone of the system, schematically designated as operating region 409. The operating region may define a limited surface area and/or a limited volume in which the interface between the operational module and the vial assembly held by the vial manipulator take place. In an example in which the operational module comprises a robotic arm, the arm may have a defined radius of operation, such that system components which are within the radius of operation fall within reach of the arm, while components that are outside the radius of operation are not reachable by the arm.

In the exemplary system setup shown, the vial manipulator 401 is located with respect to the operational module such that only some of the vial holders, such as vial holder 411, are positioned within the operating region, while other vial holder(s), such as vial holder 413, are positioned outside the operating region. In such setup, turning of the manipulator body 415 about the main axis MA (optionally being the long axis of the manipulator body) interchangeably positions one of the vial holders within the operating region, and the other vial holder out of the operating region.

A setup in which turning of the manipulator body interchanges the spatial positions of the vial holders (and thereby of the vial assemblies held at the holders) may be advantageous in that the operational module can function within a limited region, without being required to "reach out" to larger extents for interfacing with a vial assembly. In the example of a robotic arm, such setup may enable use of a shorter, more compact arm and may potentially reduce the need to move the arm to larger extents, thereby "freeing" the arm for performing additional actions simultaneously.

In an example of use, with the operational module constituting a fluid insertion component, for example: a vial assembly 407 held by vial holder 411 can be injected with fluid via the fluid insertion component; then the manipulator body can be turned 180 degrees to place vial holder 411 along with vial assembly 407 out of the operating region, and place vial holder 413 along with its vial assembly 417 in the operating region; vial assembly 407 can then be agitated to mix its contents, while vial assembly 417 can now interface with the fluid insertion component to be injected with fluid as well.

Figure 5A:
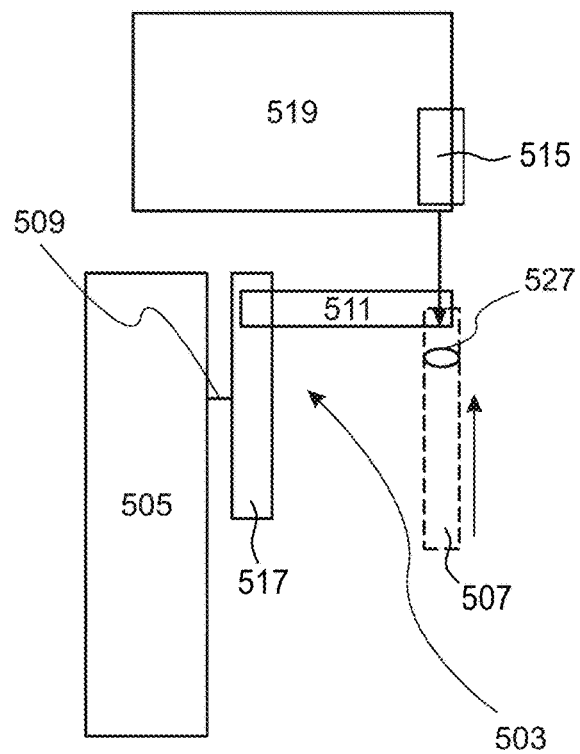
FIGS. 5A-B are schematic diagrams of an interface between a vial manipulator and an operational module constituting a fluid communication module, according to embodiments of the presently disclosed subject matter.
Figure 5B:
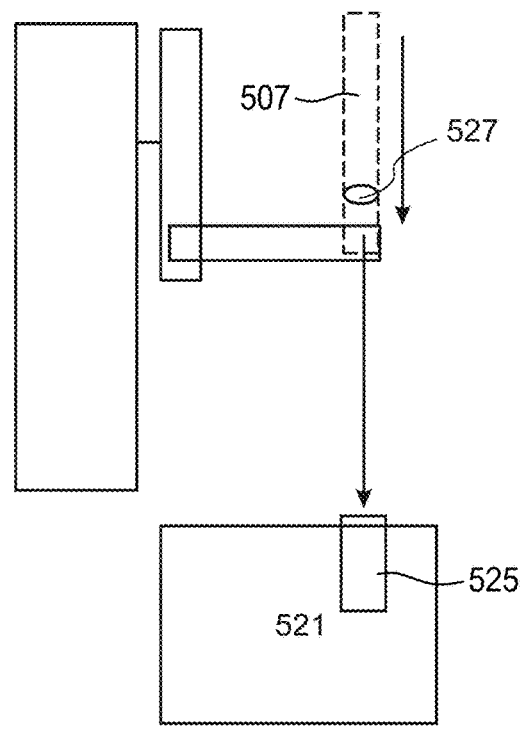

FIGS. 5A-B are schematic diagrams of an interface between a vial manipulator and an operational module constituting a fluid communication module, according to embodiments of the presently disclosed subject matter.

In FIG. 5A, a vial manipulator 501 is positioned with respect to a dilution/reconstitution module 519 of the pharmaceutical preparation system, which is configured for injection of fluid into a vial (such as for reconstituting a drug contained within the vial).

The vial manipulator comprises one or more vial holders 503 (one shown in the illustrated embodiment) connected to a body 505 of the vial manipulator, each holder comprising a pivot plate 517 which is pivotably connected to the body, and a frame 511 extending from the pivot plate and away from the body for holding the vial assembly 507. Pivoting of the pivot plate about pivot axis 509 moves the frame to change an orientation of the vial assembly. For interfacing with the dilution/reconstitution module, the vial assembly is pivoted into an orientation in which the vial assembly is aligned with a fluid insertion component 515 of the dilution/reconstitution module. In an example, the orientation is an upright orientation, with the vial assembly being vertically aligned underneath the fluid insertion component.

In a similar manner, in FIG. 5B the vial manipulator is positioned with respect to a fluid drawing module 521 which is configured for drawing fluid from a vial (for example for transferring fluid from the vial into an IV bag, for administering to a patient). The vial holder is pivoted such that the vial assembly 507 is pivoted into an orientation in which it is aligned with a fluid drawing component 525 of the fluid drawing module. In an example, the orientation is an inverted orientation, with the vial assembly being vertically aligned above the fluid drawing component.

It is noted that fluid transfer between the vial assembly and a fluid communication component can be performed, generally, when direct alignment is obtained between them. Commonly, for insertion of fluid into the vial assembly, the vial assembly needs to be oriented such that an opening 527 of the vial is positioned upwards, for example so that no contents of the vial will flow outwardly from the vial, and the fluid flow into the vial will be with the direction of gravity; and for drawing of fluid from the vial assembly, the vial assembly needs to be oriented such that opening 527 is positioned downwards, for example for ensuring that fluid will be drawn from the vial and not gas, and so that the flow out of the vial will be with the direction of gravity.

It is noted that fluid insertion component 515 and fluid drawing component 525 may each generally comprise a container which can hold fluid, used with a force applied thereto which can cause the fluid to be injected from the container, or drawn into the container. Examples of containers include a syringe, a fluid bag, a conduit or other tubing, a vial; forces which can serve to inject or draw fluid can include pressure (e.g. applied by a pump), centrifugal forces, gravitational forces, and/or other suitable force.

Figure 6A:
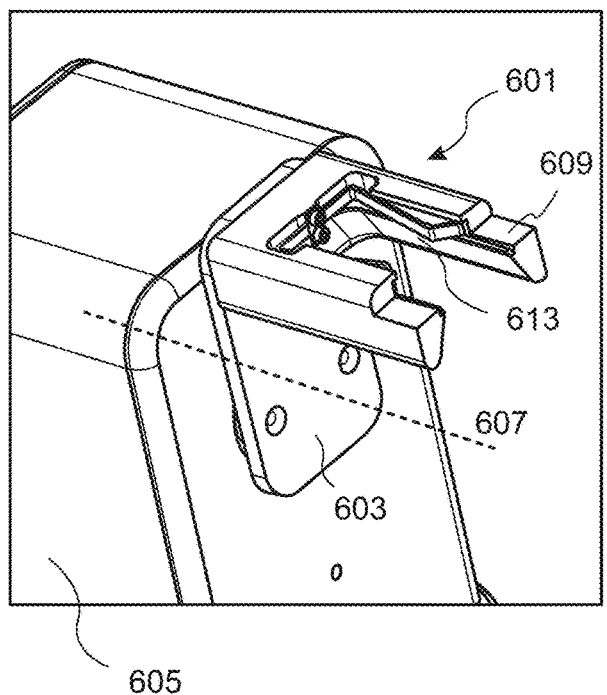
FIGS. 6A-B are isometric views of a vial holder pivotably connected to a vial manipulator, according to an embodiment of the presently disclosed subject matter.
Figure 6B:
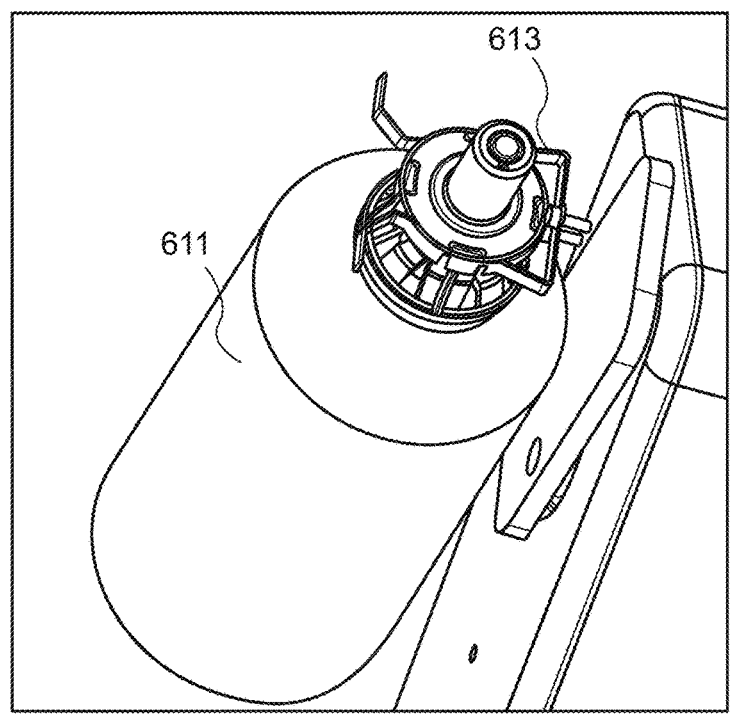

FIGS. 6A-B are isometric views of a vial holder pivotably connected to main body of a vial manipulator, according to an embodiment of the presently disclosed subject matter.

In FIG. 6A, a vial holder 601 comprises a pivot plate 603 which is pivotably mounted onto a wall of a manipulator body 605. A frame 609 is fixedly connected to the pivot plate and extends from the plate outwardly, facing away from the manipulator body. Frame 609 is partially open, for example, U shaped, for enabling the insertion of a vial assembly 611 (shown in FIG. 6B). A set of clamping arms 613 extend internally to the frame (the clamping arms are shown without the frame in FIG. 6B for the purpose of explanation). The clamping arms can be resilient, (springy), so as to closely clamp the vial assembly received within the frame. Optionally, during insertion, the vial assembly is pressed or pushed onto the frame, and is clamped by the clamping arms. The vial assembly may be brought and inserted to the frame automatically, such as via a robot arm or other automatic transfer means, and/or manually, such as by an operator of the pharmaceutical preparation system.

As shown in the figures, the pivot plate is connected to the manipulator body such that a pivot axis 607 of the vial holder passes at an upper portion of the manipulator body. An axial location of the pivot axis (along the length of the manipulator body) can be defined so that a sufficient space remains above and below the pivot axis for the vial assembly to extend along, in both the upright and inverted orientations of the vial assembly.

It is noted that while a frame with clamping arms is shown herewith, a reversable attachment of the vial assembly to the frame can be carried out using any suitable grasping means, such as clamps, grippers, snaps, fasteners, or frames shaped otherwise.

It is further noted that while the frame is fixedly attached to the pivot plate, so that the frame pivots along with the plate, other embodiments may include an attachment which enables at least some degree of movement of the frame, for example, a pivot attachment of the frame to the pivot plate which enables at least partial pivoting of the frame. In some examples, the frame can be directly connected to the manipulator body by any suitable connection arrangement allowing pivoting of the frame to agitate the vial assembly held thereby. In some examples, the pivot plate can be located inside the manipulator body.

Figure 7A:
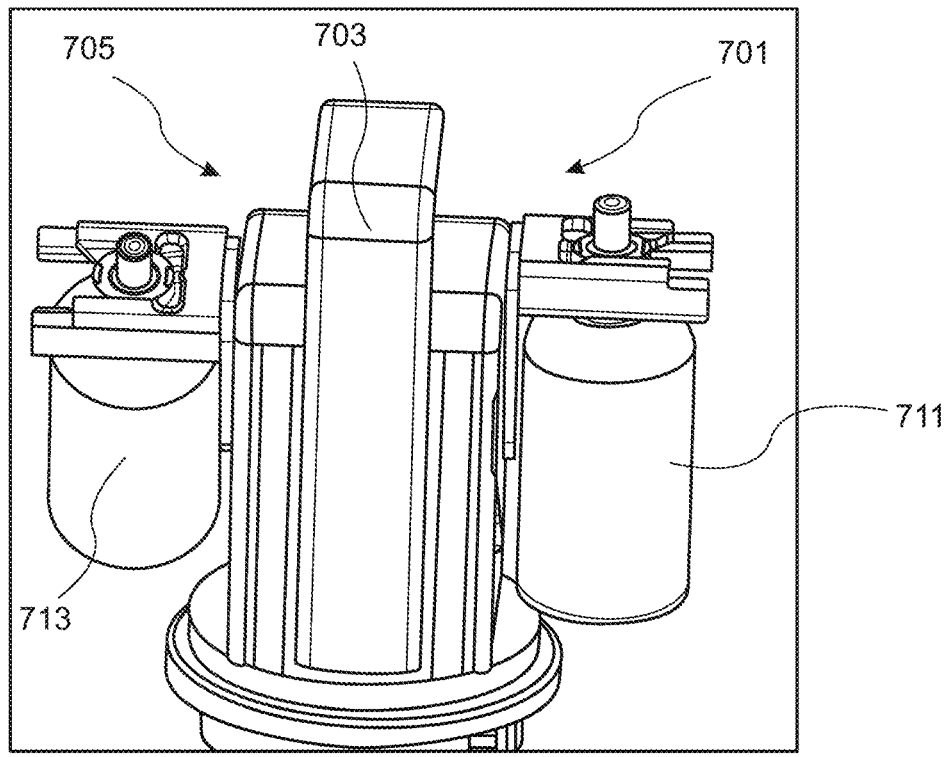
FIGS. 7A-B show vial manipulators holding vial assemblies at various orientations, according to embodiments of the presently disclosed subject matter.
Figure 7B:
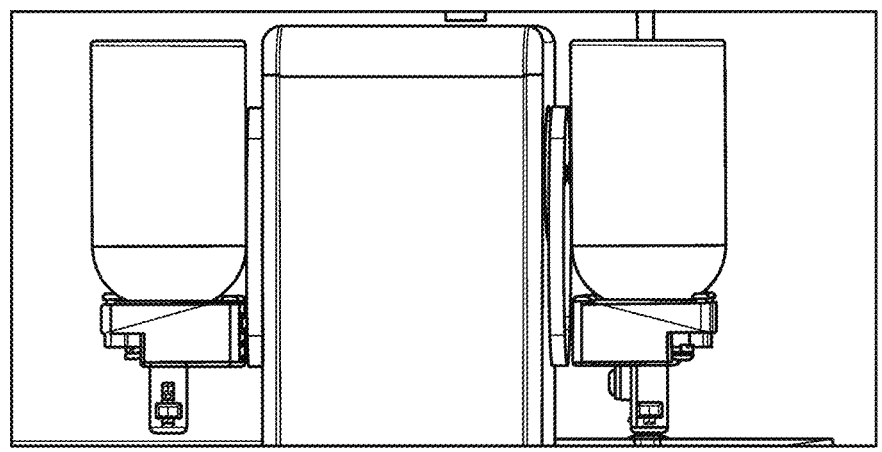

FIGS. 7A-B show vial manipulators holding vial assemblies at various orientations, according to embodiments of the presently disclosed subject matter. In the example of FIG. 7A, two vial holders 701, 705 are connected to the manipulator body 703, facing opposite directions. A vial assembly 711 held at holder 701 is shown at an initial, upright orientation; a vial assembly 713 held at holder 705 is slightly pivoted (for example during agitation of the vial assembly, or when the vial assembly is held steady at the pivoted orientation, such as for the purpose of fluid transfer). In the example of FIG. 7B, both vial holders are pivoted by 180 degrees, holding the vial assemblies at inverted (upside down) orientations.

Figure 8:
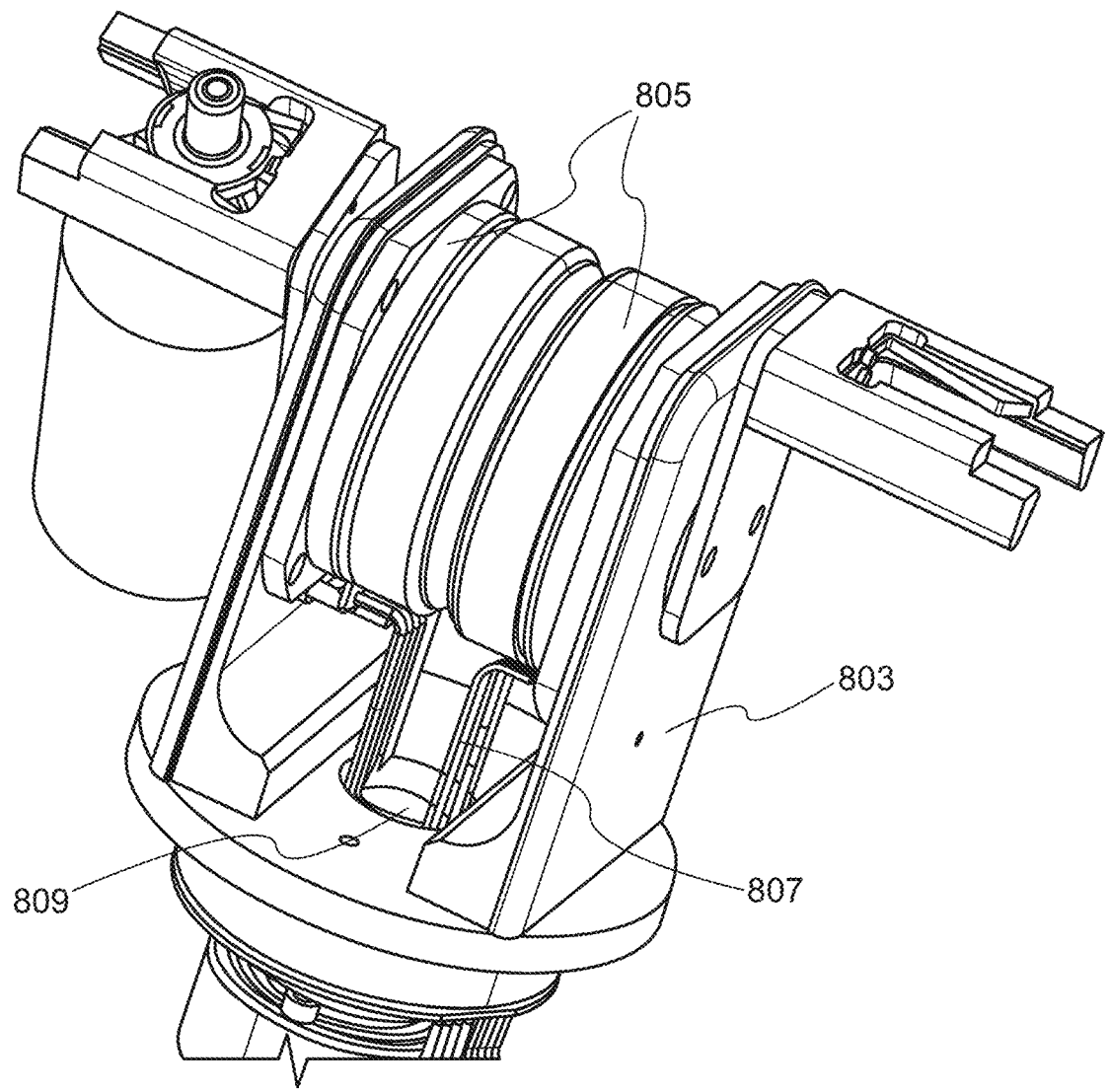
FIG. 8 is an isometric view of a vial manipulator, according to an embodiment of the presently disclosed subject matter.

FIG. 8 is an isometric view of a vial manipulator, according to an embodiment of the presently disclosed subject matter.

Generally, the pivot mechanism of the vial holder includes or is operably connected to one or more actuators, such as one or more motors, for driving movement of the pivot plate of the vial holder with respect to the manipulator body.

In some embodiments, the actuators are housed within the manipulator body. Additionally or alternatively, the actuator(s) can be external to the manipulator body, and are operably connected to the pivot plate(s).

In some embodiments, each actuator can be configured to drive movement of a pivot plate of a single vial holder. Alternatively, an actuator can be configured to drive movement of pivot plates of two or more vial holders.

An actuator may include a motor, such as a servo motor, a hydraulic motor, a pneumatic motor, an electric motor, a magnetic motor, a mechanical actuator such as a spring, a piston and a combination thereof.

In this example the vial manipulator is shown, for explanation purposes, with a part of the external housing of the manipulator body 803 removed. Two motors 805, such as servo motors, are located side by side, each motor configured for driving movement of the respective vial holder to which it is connected. Power supply is provided to the motors via electrical cables 807, extending for example as shown through a designated opening 809 defined at a rotatable platform 810 on which the manipulator body is mounted.

In some embodiments, as shown in this example, a plurality of motors (optionally each driving movement of a different vial holder) are symmetrically arranged with respect to each other, for example inside the housing of the manipulator body. In an example as shown, two motors are aligned back to back. In another example, in which four vial holders are four motors are symmetrically arranged, for example at 90 degree angles with respect to each other. Other examples may include an alternating configuration of motors arranged along the length of the manipulator body, for example, with multiple motors intermeshed with each other.

By arranging the actuators (e.g. motors) of the pivot mechanisms in a compact arrangement, such as back-to-back, intermeshed, or other compact arrangement, a width 811 of the manipulator body (e.g. as measured between opposite walls of the housing 803) can be kept to a minimum. This enables a compact configuration in which the vial holders are as close as possible to each other, yet can still be operated independently and without interfering with each other's movement. A compact arrangement of the pivot mechanisms can further provide for placing multiple vial holders on the same manipulator body, thereby potentially reducing a total footprint of the pharmaceutical preparation system, as the vial manipulator can hold and move multiple vials within a relatively small, limited space.

In some embodiments, a distance measured across the manipulator body, between the pivot plates of opposite vial holders is no longer than 15 cm, 10 cm, 5 cm, 4 cm, 3 cm, 2 cm or intermediate or shorter distance.

Figure 9A:
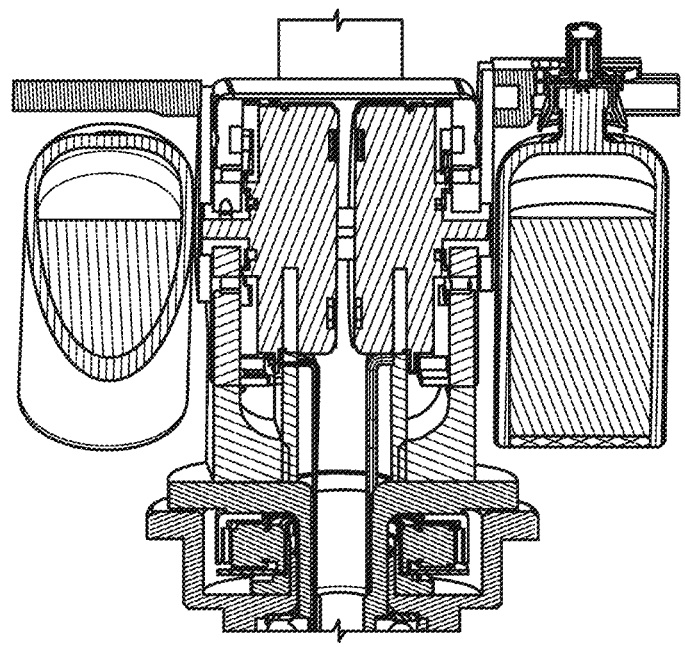
FIGS. 9A-B are cross sectional views of vial manipulators for example as shown in FIGS. 7A-B, according to embodiments of the presently disclosed subject matter.
Figure 9B:
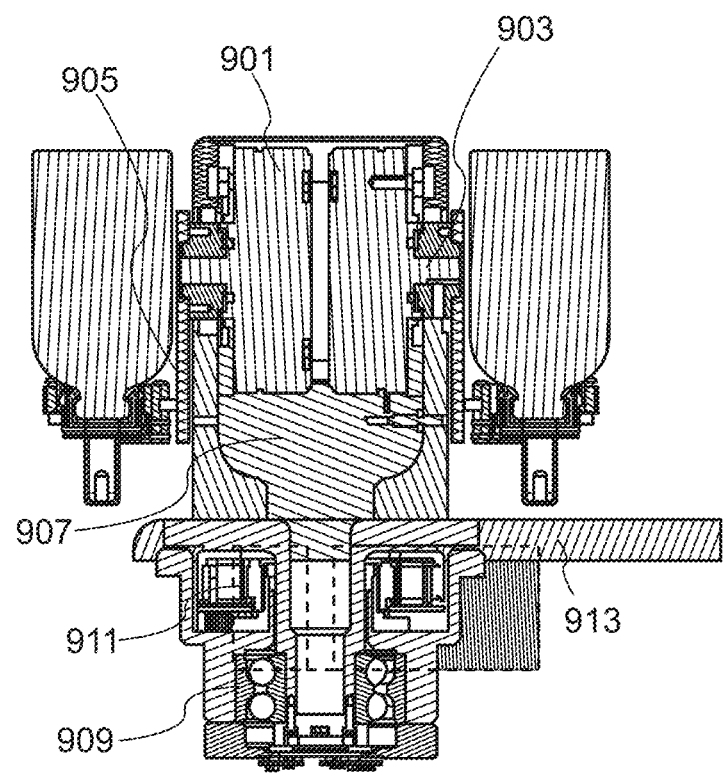

FIGS. 9A-B are cross sectional views of vial manipulators for example as shown in FIGS. 7A-B, according to embodiments of the presently disclosed subject matter.

As shown, each motor 901 can be connected to its associated vial holder, and more specifically to the pivot plate 905 of the vial holder by a shaft bearing 903, which transfers the motor rotation to the pivotal motion of the pivot plate. The shaft bearing 903 extends from the motor, on an inner side of the housing of the manipulator body, to an outer side of the housing, where the pivot plate is located.

As further shown, a turning mechanism of the manipulator body 907 is actuated by one or more actuators, such as a motor 909. Motor 909 is connected to a gear 911, such that rotation of the gear by the motor turns the manipulator body relative to a platform 913 (e.g. a table) of the pharmaceutical preparation system.

Figure 10A:
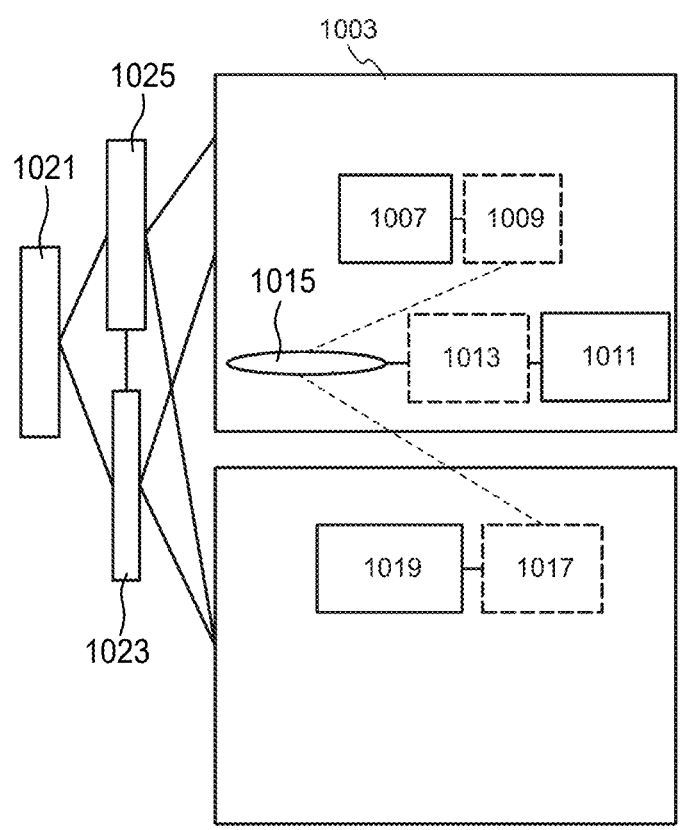
FIGS. 10A-B are a schematic diagram (FIG. 10A) and an illustration (FIG. 10B) of an arrangement comprising a vial manipulator and an operational module constituting a reconstitution/dilution module, according to an embodiment of the presently disclosed subject matter.
Figure 10B:
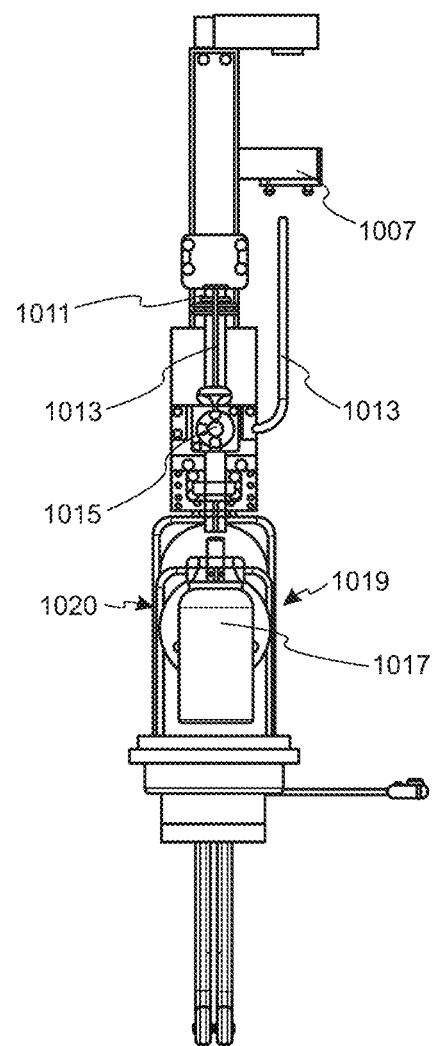

FIGS. 10A-B are a schematic diagram (FIG. 10A) and an illustration (FIG. 10B) of an arrangement comprising a vial manipulator and an operational module constituting a reconstitution/dilution module, according to an embodiment of the presently disclosed subject matter.

In some embodiments, a vial manipulator for example as described herein is used with a reconstitution and/or dilution module which can obtain or receive fluid from a fluid source (e.g. from an IV bag, a syringe, a container) and introduce that fluid, at a selected volume, into a drug vial so as to dilute a concentrated liquid drug or to reconstitute a dry powder drug by dissolving the powder in the fluid.

The fluid introduced by the module can include a diluent such as a saline, water, or other suitable fluid.

The volume of fluid introduced into the vial can be controlled based on the specific content of the vial, for example, according to a prescription label of the drug and/or other instructions, so as to reach a selected concentration or a selected total volume.

The reconstitution and/or dilution module for example as described herein is configured for use with a plurality of disposable (optionally, single use) components, such as an IV bag, a syringe, as well as connector(s) and/or adaptor(s) used with these components. Optionally, components are used with the module more than once, for example, a syringe may be used multiple times when serving, for example, as a piston which draws and/or injects fluid.

As shown in the present example, the dilution and/or reconstitution module 1003 comprises:

an IV bag holder 1007 configured for holding an IV bag 1009 (bag not shown in FIG. 10B), for example by having supports such as tongs, hooks, and/or other suitable support for maintaining hold of an IV bag;

a syringe assembly manipulator 1011, configured for holding and operating a syringe assembly 1013. In some embodiments, the syringe assembly manipulator is operable to move the syringe assembly as a whole, for example move the syringe axially towards or away from the vial manipulator. In some embodiments, the syringe assembly manipulator is configured to move components of the syringe assembly independently, such as move a plunger of the syringe axially to draw or inject fluid;

a selector 1015, such as a T-shaped stopcock, positioned and configured to provide a switchable fluid connection of the syringe assembly to the IV bag (such as via tubing 1016, shown in FIG. 10B) or to a vial assembly 1017 held at the vial manipulator 1019. In some embodiments, one or more one-way valves (not shown) can be used, with the one-way valve(s) positioned to allow for fluid to flow only from the IV bag and into the syringe assembly, and/or only from the syringe assembly to the vial assembly.

As illustrated in FIG. 10B, the dilution and/or reconstitution module is located vertically above the vial manipulator, so that the vial assembly held by a holder 1020 of the vial manipulator can be aligned with the syringe assembly for the transfer of fluid, e.g. for injection of fluid into the vial.

Operation of the arrangement can be controlled by at least one controller 1021, which is configured to control a plurality of actuators 1023 of the vial manipulator and of the dilution and/or reconstitution module. In some embodiments, the controller is in communication with one or more imagers 1025 used for verifying, identifying and/or measuring data. Non-limiting examples of data collected via the imagers can include: the type and/or amount of fluid; existence of powder particles in the vial following agitating of the vial, existence of gas bubbles in fluid, a volume of fluid, and/or other data.

In an exemplary use process, the controller instructs an actuator of the vial holder to hold the vial assembly steady and at an upright, non-pivoted orientation. The controller instructs the selector to place the syringe assembly in fluid communication with the IV bag, and to draw, by controlled pulling of the syringe plunger (via the syringe assembly manipulator), a defined volume of diluent from the IV bag. Then, the controller instructs the selector to place the syringe assembly in fluid communication with the vial assembly, and to inject a defined volume of diluent into the vial. Then, the controller may instruct an actuator of the vial holder to repetitively pivot the vial assembly, so as to agitate the filled vial and mix its contents. Optionally, the controller instructs the turning mechanism of the vial manipulator to turn the manipulator body about its axis, changing a position of the vial assembly. Turning of the manipulator body may be performed, for example, before agitating the vial assembly, or after agitating the vial assembly.

In some embodiments, the filled vial remains held by the vial manipulator for the process of drawing the prepared drug from the vial, for example as described below in FIGS. 11A-B.

Figure 11A:
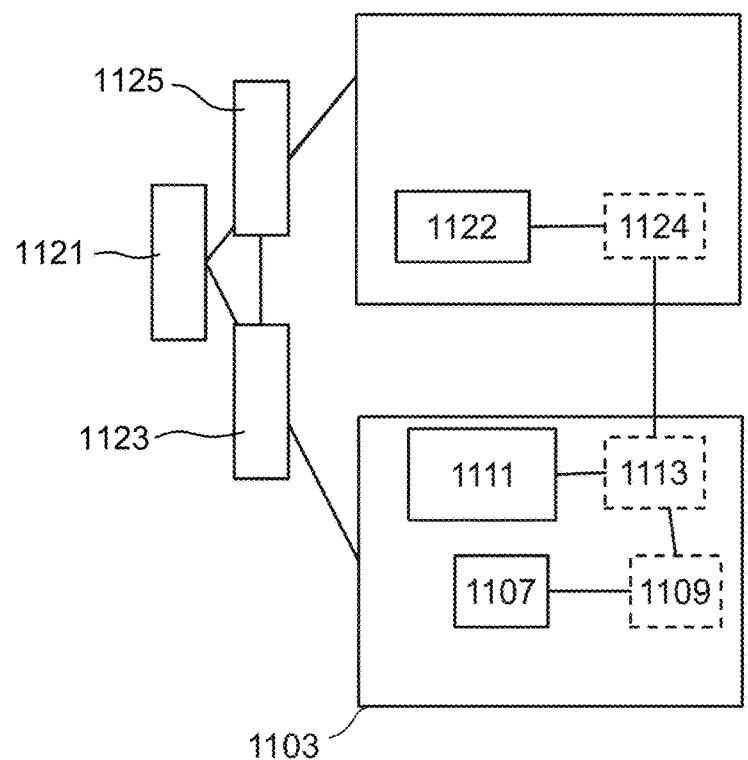
FIGS. 11A-B are a schematic diagram (FIG. 11A) and an illustration (FIG. 11B) of an arrangement comprising a vial manipulator and an operational module constituting a fluid drawing module, according to an embodiment of the presently disclosed subject matter.
Figure 11B:
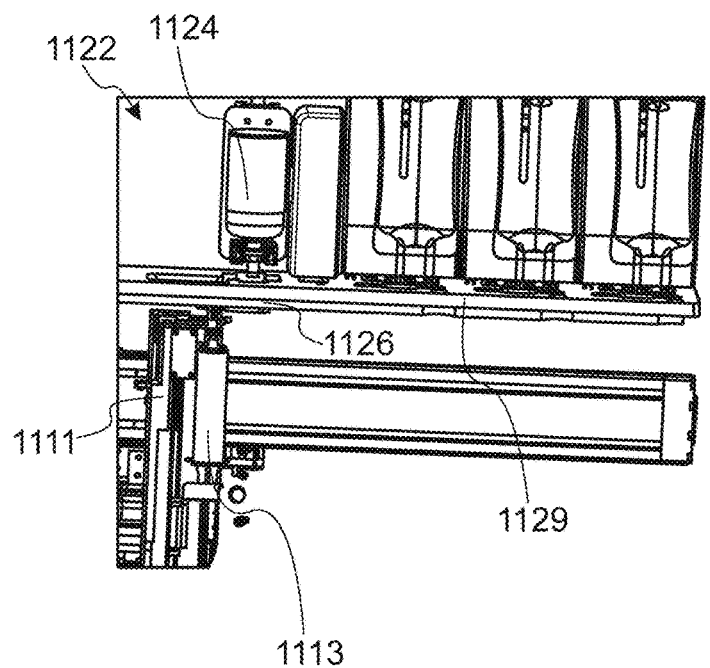

FIGS. 11A-B are a schematic diagram (FIG. 11A) and an illustration (FIG. 11B) of an arrangement comprising a vial manipulator and an operational module constituting a fluid drawing module, according to an embodiment of the presently disclosed subject matter.

In some embodiments, a vial manipulator for example as described herein is used with a fluid drawing module which can draw fluid from the vial, for example draw a prepared drug form the vial, and optionally transfer the drug into an IV bag or other container for storing of the drug and/or for administering the drug to a patient.

The volume of drug drawn from the vial can be controlled based on need, for example according to a patient prescription or other instructions.

The fluid drawing module for example as described herein is configured for use with a plurality of disposable (optionally, single use) components, such as an IV bag, a syringe, as well as connector(s) and/or adaptor(s) used with these components. Optionally, components are used with the module more than once, for example, a syringe may be used multiple times when serving, for example, as a piston which draws and/or injects fluid.

As shown in the present example, the fluid drawing module 1103 comprises:

- an IV bag holder 1107 configured for holding one or more IV bags 1109, for example by having supports on which the bags can be positioned. It is noted that containers other than/in addition to IV bags may be used for receiving the ready drug that is drawn from the vial;
- a syringe assembly manipulator 1111, configured for holding and operating a syringe assembly 1113. In some embodiments, the syringe assembly manipulator is operable to move the syringe assembly as a whole, for example move the syringe axially towards or away from the vial manipulator. In some embodiments, the syringe assembly manipulator is configured to move components of the syringe assembly independently, such as move a plunger of the syringe axially to draw or inject fluid.

As illustrated in FIG. 11B, the fluid drawing module can be moved, e.g. slid to a position which is vertically below the vial manipulator 1122, so that the vial assembly 1124 held by a holder of the vial manipulator can be aligned with the syringe assembly of the fluid drawing module for the transfer of fluid, e.g. for drawing of fluid from the vial. In some embodiments, as shown, the syringe assembly is moveable horizontally on a frame 1126, such as along an horizontal axis of the platform (table) 1129 or an axis parallel thereto.

Operation of the arrangement can be controlled by at least one controller 1121, which is configured to control a plurality of actuators 1123 of the vial manipulator and of the fluid drawing module. In some embodiments, the controller is in communication with one or more imagers 1125 used for verifying, identifying and/or measuring data, for example, verifying or identifying the type and/or amount of drug in the vial; verifying and/or measuring an amount of drug drawn by the module into the syringe; verifying a position of the syringe assembly and/or of the vial assembly, and/or other data.

In an exemplary use process, the controller instructs an actuator of the vial holder to hold the vial assembly steady and at an inverted, upside down orientation. The controller instructs the syringe assembly manipulator to place the syringe assembly in fluid communication with the vial assembly. Then, the controller instructs the syringe assembly manipulator to draw, by controlled pulling of the syringe plunger, a defined volume of drug from the vial.

Optionally, the controller instructs the turning mechanism of the vial manipulator to turn the manipulator body about its axis, changing a position of the vial assembly. Turning of the manipulator body may be performed, for example, after drawing fluid from the vial assembly, such as to place a new vial assembly in a position from which the drug can be drawn.

Optionally, the controller instructs the syringe assembly manipulator to position the syringe assembly in fluid communication with the IV bag, for injecting the ready drug into the bag. Optionally, placing the syringe assembly in fluid communication with the IV bag is performed by moving (e.g. sliding) the syringe manipulator along the frame, to a position in which it aligned with an IV bag.

Figure 12:
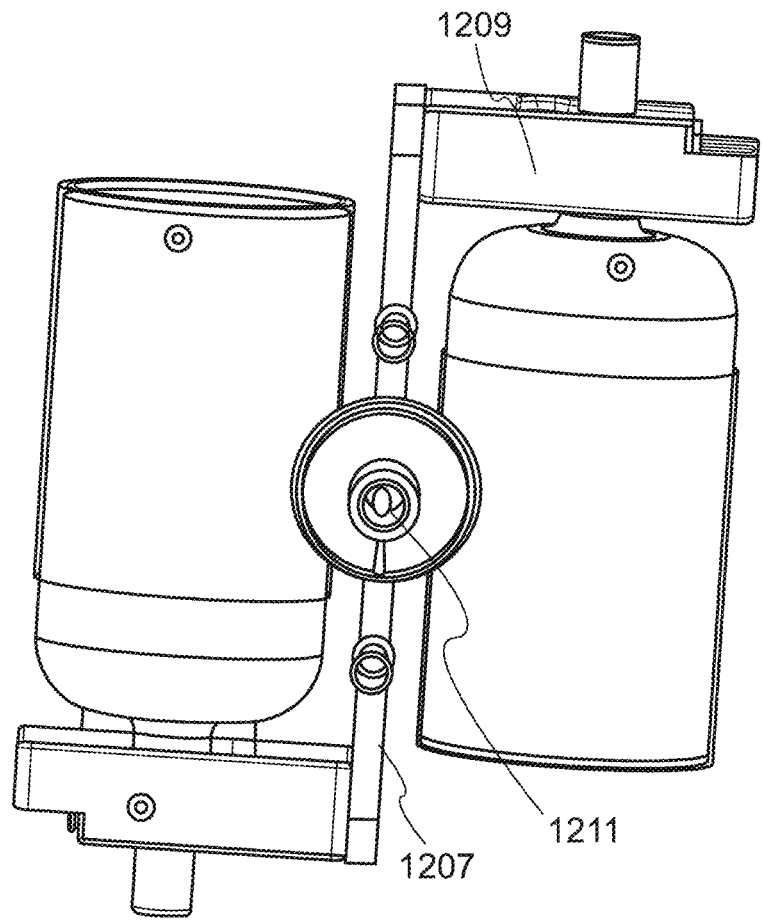
FIG. 12 is a side view of another vial manipulator structure, according to an embodiment of the presently disclosed subject matter.

FIG. 12 is a side view of another vial manipulator structure, according to an embodiment of the presently disclosed subject matter.

In the example shown, two vial holders are connected to a pivotable bar 1207, the vial holders facing opposite directions. A frame 1209 of each the holders is connected to an opposite end of the bar, such that the vial assemblies held by the holders are in opposite orientations with respect to each other (one vial assembly is upright, while the other is inverted). In use, pivoting of the bar about a pivot axis passing through pivot point 1211 flips the vial assemblies such that an inverted vial assembly is now upright, and vice versa.

Bar 1207 can itself constitute a manipulator body or be connected to a manipulator body which is configured for turning with respect to a platform (not shown) by a turning mechanism for example as described herein. Turning of the vial manipulator can interchange the positions of the vial holders.

Figure 13:
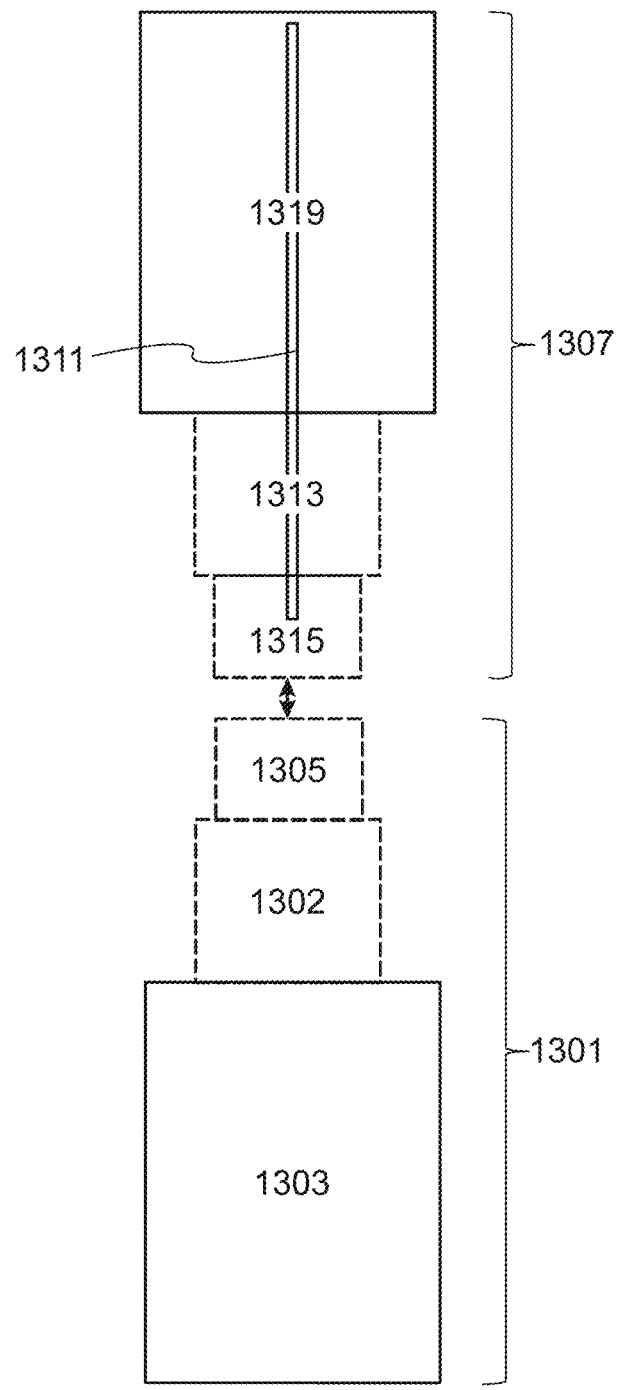
FIG. 13 is a schematic diagram of syringe assembly and vial assembly components which can be used in a pharmaceutical preparation system and interface with each other, according to embodiments of the presently disclosed subject matter.

FIG. 13 is a schematic diagram of syringe assembly and vial assembly components which can be used in a pharmaceutical preparation system and interface with each other, according to embodiments of the presently disclosed subject matter.

A vial assembly 1301 includes a vial 1303, e.g. a standard drug vial. Optionally, a vial adaptor 1302 is connected onto a top portion of the vial, and can be grasped for transferring the vial. Optionally, a vial septum 1305 is configured as part of the vial adaptor or is separately mounted onto the vial adaptor, for at least partially sealing access to the vial.

A syringe assembly 1307 includes a syringe 1309, e.g. a standard syringe. The syringe can comprise a needle 1311 or a cannula suitable for transferring fluid and optionally for penetrating a septum or other seal or structure for accessing a container, such as the vial. The needle may include a bevel at a distal portion thereof.

Optionally, a syringe connector 1313 is connected onto a hub of the syringe.

Optionally, a syringe septum 1315 is configured as part of the connector or is separately mounted onto the connector.

In use, fluid communication can be established between the syringe assembly and the vial assembly, with the syringe needle optionally being advanceable into and/or through the vial septum and/or into the vial itself. In some embodiments, fluid communication can be established only once the vial septum and the syringe septum contact each other, and optionally apply counterforce onto each other which is above a selected force threshold.

Figure 14A:
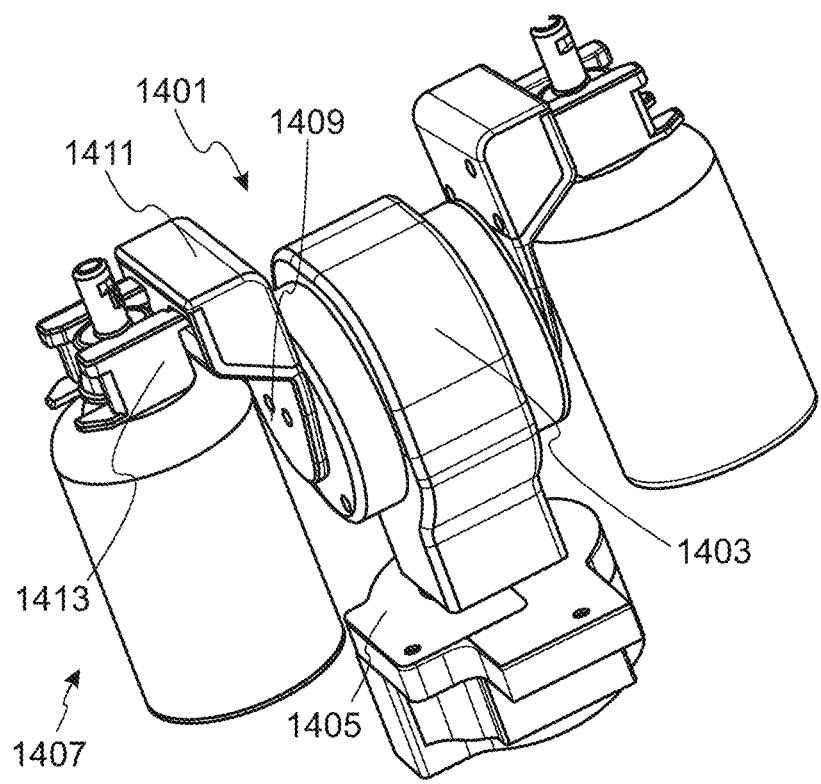
FIG. 14A is an isometric view of a vial manipulator, according to an embodiment of the presently disclosed subject matter.

FIG. 14A is an isometric view of a vial manipulator, according to an embodiment of the presently disclosed subject matter.

Figure 14B:
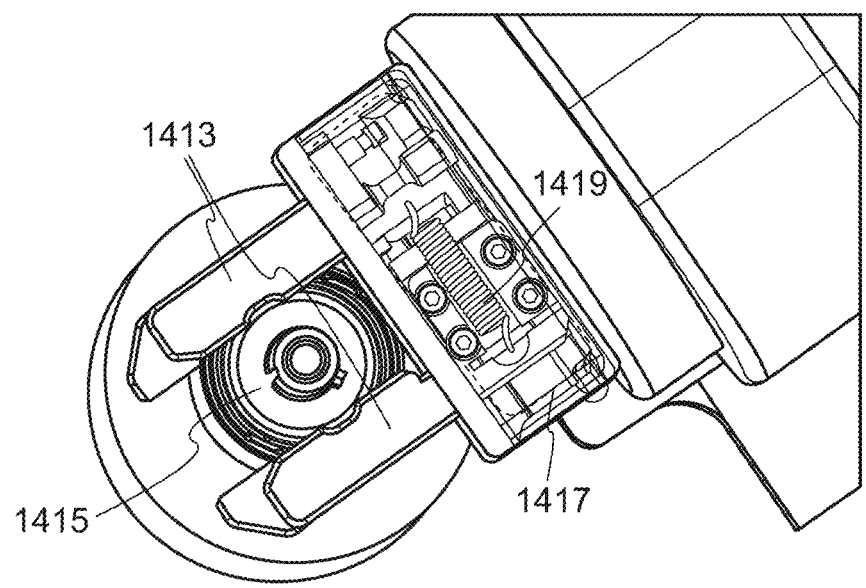
FIG. 14B is an enlarged top view of a vial holder of a vial manipulator as shown in FIG. 14A, according to an embodiment of the presently disclosed subject matter.

The vial manipulator 1401 of this example comprises a manipulator body 1403 mounted onto a disc-shaped platform 1405, which serves for turning the manipulator body about the body long axis. Two vial holders 1407 are connected to opposing outer surfaces of a housing of the manipulator body. Each the vial holders includes: a pivot plate 1409 that is pivotably connected to the body, a rectangular frame 1411 formed as a continuous extension of a top portion of the pivot plate, and a set of clamping arms 1413 extending outwardly from the frame, facing away from the manipulator body, for receipt of the vial assembly. As shown in FIG. 14B, which is an enlarged top view of the vial holder, the clamping arms are configured for snap-fitting onto a vial assembly when the vial assembly is pushed inwardly towards the pivot plate. (In this example, the clamping arms press obtain hold of a vial adaptor 1415 mounted onto the top of the vial).

The clamping arms are configured to be distanced away from each other for allowing insertion of the vial assembly, and then to elastically bounce back towards each other for clamping onto the vial assembly. This is enabled, in this example, by a spring-based mechanism 1417 which is housed within the frame 1411. A spring 1419 (such as a coil spring) extends at least partially across the two clamping arms, between the ends of the clamping arms which are connected to the frame. The spring is configured to extend longitudinally when the clamping arms are pushed away from each other (during insertion of the vial assembly), and to return back to its compressed state for pulling the clamping arms towards each other such that the vial assembly is grasped between the clamping arms.

It is noted that other elastic members (e.g. an elastic band) can be used in addition to or in replacement of a spring, for pulling the clamping arms towards each other.

Figure 15:
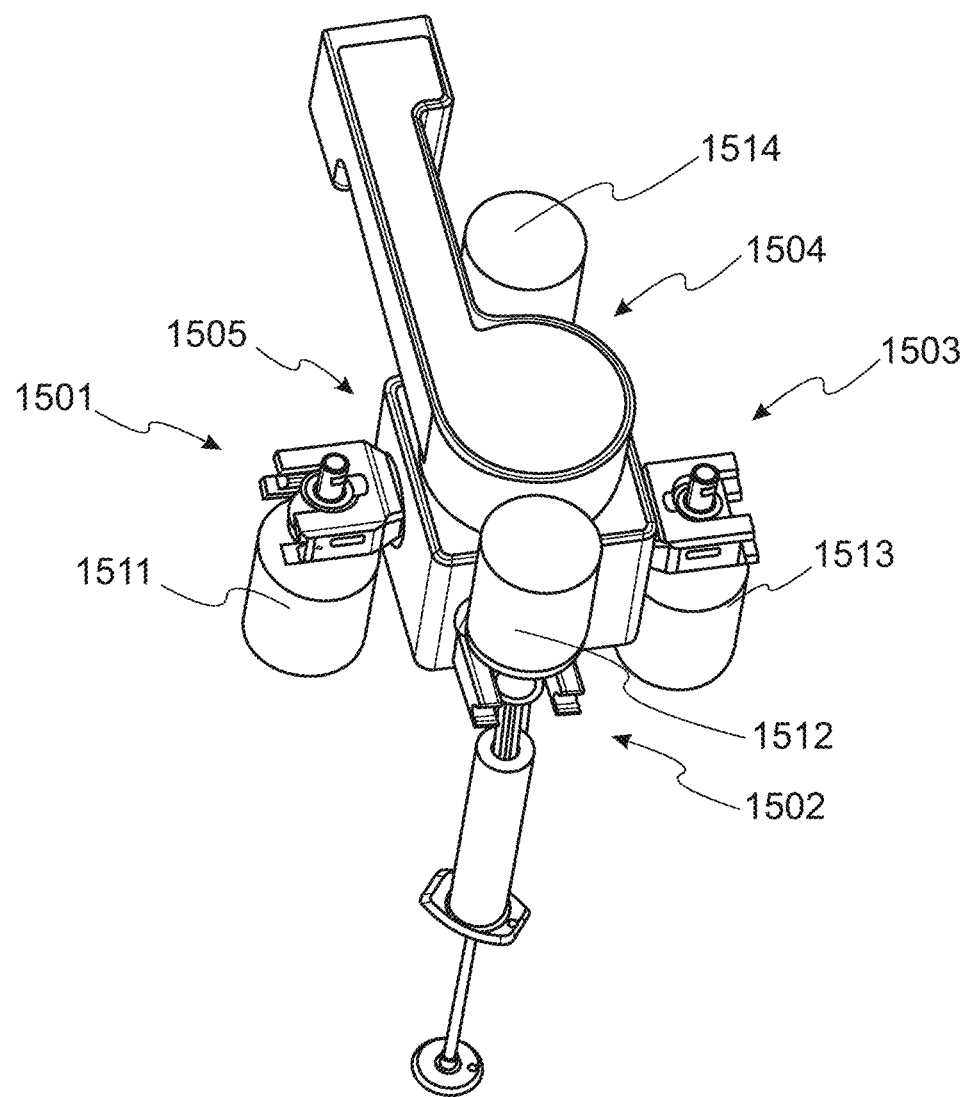
FIG. 15 shows vial manipulator holding vial assemblies at various orientations, according to an embodiment of the presently disclosed subject matter.

FIG. 15 shows a vial manipulator holding vial assemblies at various orientations, according to an embodiment of the presently disclosed subject matter. In the example of FIG. 15, four vial holders 1501, 1502, 1503, and 1504 are connected to the manipulator body 1505, facing in directions 90 degrees shifted from each other. The manipulator body 1505, in the illustrated example has a polygonal horizontal cross-sectional shape having four walls, whereas, each of the vial holders extend outwardly from a respective wall of the manipulator body 1505.

Two vial assemblies 1511 and 1513 held at holders 1501 and 1503, respectively, are shown at an initial, upright orientation; and vial assemblies 1512 and 1514 held at holders 1502 and 1504, respectively, are shown at an inverted orientation (for example during agitation of the vial assemblies, or when one or more of the vial assemblies are held steady at the pivoted orientation, such as for the purpose of fluid transfer). It is to be understood herein that although the vial assembly 1512 has been shown as being connected to a syringe, it is not necessary that a vial assembly has to be connected to a syringe. In fact, in some examples, the vial manipulator can hold and pivot a vial assembly together with a syringe as well.

A corresponding pivot plate (not shown) of each of the vial holders is located within the manipulator body 1505, and a corresponding frame extends outwardly therefrom. It is to be understood herein that the description with respect to pivoting of the vial holders and turning of the manipulator body provided herein above for various examples, applies mutatis mutandis to the vial holders 1501, 1502, 1503, and 1504 and the manipulator body 1505 as well.

While various inventive examples have been described and illustrated herein, those of ordinary skill in the art will readily envision a variety of other means, materials, or structure for performing the function, obtaining the results, or one or more of the advantages described herein, and each of such variations or modifications is deemed to be within the scope of the inventive examples described herein. More generally, those skilled in the art will readily appreciate that all parameters, dimensions, materials, and configurations described herein are meant to be for example only and that the actual parameters, dimensions, materials, and configurations will depend upon the specific application or applications for which the inventive teachings is/are used. Those skilled in the art will recognize or be able to ascertain using no more than routine experimentation, many equivalents to the specific inventive examples described herein. It is, therefore, to be understood that the foregoing examples are presented by way of example only and that, within the scope of the appended claims, equivalents thereto, and any claims supported by the present disclosure, inventive examples may be practiced otherwise than as specifically described and claimed. Inventive examples of the present disclosure are directed to each individual feature, system, article, material, composition, kit, method, and step, described herein. In addition, any combination of two or more such features, systems, articles, materials, compositions, kits, methods, and steps, if such features, systems, articles, materials, compositions, kits, methods, and steps, are not mutually inconsistent, is included within the inventive scope of the present disclosure.

Examples disclosed herein may also be combined with one or more features, functionality, or materials, as well as complete systems, devices or methods, to yield yet other examples and inventions. Moreover, some examples, may be distinguishable from the prior art by specifically lacking one and/or another feature disclosed in the particular prior art reference(s); i.e., claims to some examples may be distinguishable from the prior art by including one or more negative limitations.

Also, as noted, various inventive concepts may be embodied as one or more methods, of which an example has been provided. The acts performed as part of the method may be ordered in any suitable way. Accordingly, examples may be constructed in which acts are performed in an order different than illustrated, which may include performing some acts simultaneously, even though shown as sequential acts in illustrative examples.

Any and all references to publications or other documents, including but not limited to, patents, patent applications, articles, webpages, books, etc., presented anywhere in the present application, are herein incorporated by reference in their entirety. Moreover, all definitions, as defined and used herein, should be understood to control over dictionary definitions, definitions in documents incorporated by reference, and ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one example, to A only (optionally including elements other than B); in another example, to B only (optionally including elements other than A); in yet another example, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one example, to at least one, optionally including more than one, A, with no B present (and optionally including elements other than B); in another example, to at least one, optionally including more than one, B, with no A present (and optionally including elements other than A); in yet another example, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

Although various example embodiments have been described in detail herein, however, in view of the present disclosure many modifications are possible in the example embodiments without materially departing from the concepts of present disclosure. Accordingly, any such modifications are intended to be included in the scope of this disclosure. Likewise, while the disclosure herein contains many specific combinations, these specific combinations should not be construed as limiting the scope of the disclosure or of any of the appended claims, but are provided as a description pertinent to one or more specific embodiments that may fall within the scope of the disclosure and the appended claims. Any described features from the various embodiments disclosed may be employed in combination with other disclosed embodiments. In addition, other embodiments of the present disclosure may also be devised which lie within the scopes of the disclosure and the appended claims.

This disclosure provides various examples, embodiments, and features which, unless expressly stated or which would be mutually exclusive, should be understood to be combinable with other examples, embodiments, or features described herein.

The invention claimed is:

1. A vial manipulator for use in a robotic pharmaceutical preparation system comprising a fluid communication component, the vial manipulator comprising:
   a manipulator body defining a main axis;
   a first vial holder pivotably coupled to the manipulator body and configured to receive and hold a vial assembly;
   a first pivoting mechanism for pivoting the first vial holder about a first axis extending outwardly from the main body in a first direction;
   a second vial holder pivotably coupled to the manipulator body and configured to receive and hold a vial assembly;
   a second pivoting mechanism for pivoting the second vial holder about a second axis extending outwardly from the main body in a second direction which is different than the first direction; and
   a controller configured to control the first pivoting mechanism and the second pivoting mechanism to pivot their associated vial holder to assume the following states:
      a first state in which the vial assembly held by the vial holder is in an upright orientation in which fluid communication is established with the fluid communication component for insertion of fluid by the fluid communication component;
      a second state in which the vial assembly held by the vial holder is in an inverted orientation in which fluid communication is established with the fluid communication component for drawing fluid by the fluid communication component;

wherein the controller is configured to control one of the first and second pivoting mechanisms to pivot its associated vial holder to assume the first state or the second state, and wherein simultaneous to said associated vial holder being in the first state or the second state, the controller is configured to control the other of the first and second pivoting mechanisms to operate either in:

an agitating mode in which the vial holder is repetitively pivoted, for mixing a content of a vial assembly held by the vial holder; or an orientation setting mode in which the vial holder sets a temporarily fixed orientation of a vial assembly held by the vial holder.

2. The vial manipulator according to claim 1, wherein the first direction and the second direction define an angle of at least 90 degrees between them.

3. The vial manipulator according to claim 1, wherein the first direction and the second direction define an angle of 180 degrees between them, and are directly opposite each other such that the first and second axes are directly aligned.

4. The vial manipulator according to claim 1, wherein the first and second axes are perpendicular to the main axis.

5. The vial manipulator according to claim 1, wherein each of the first and second pivot mechanisms comprises a pivot attachment of the respective vial holder to the manipulator body, with the respective first and second axes passing therethrough.

6. The vial manipulator according to claim 5, wherein each of the first and second vial holders comprises:

a pivot plate pivotably connected to a wall of the manipulator body at the pivot attachment;

a frame connected to and extending from the pivot plate, the frame configured to receive and hold the vial assembly;

wherein pivoting of the pivot plate is configured to carry the frame along, thereby changing an orientation of the vial assembly held by the frame.

7. The vial manipulator according to claim 6, wherein the frame is fixedly connected to the pivot plate, and comprises a set of clamping arms extending internally to the frame for clamping onto the at least a portion of the vial assembly.

8. The vial manipulator according to claim 1, further comprising a turning mechanism configured for turning the manipulator body about the main axis.

9. The vial manipulator according to claim 1, wherein pivoting of the vial holder is configured to change an orientation of the vial assembly from an initial orientation in which the vial assembly is upright.

10. The vial manipulator according to claim 9, wherein a vial assembly held by each of the vial holders is pivotably moveable on a respective first plane and second plane, each of which intersects and is perpendicular to the first axis and the second axis, respectively, and through which a respective third axis and fourth axis, both being parallel to the main axis, extend; whereby at the initial orientation of the vial assembly held by the vial holder, a longitudinal axis of the respective vial assembly is aligned with the third axis and the fourth axis, respectively.

11. The vial manipulator according to claim 1, wherein each of the first and second pivoting mechanisms comprises a respective actuator for pivotably moving the vial holder, wherein the actuators are controlled by the controller.

12. The vial manipulator according to claim 11, wherein actuators of the first and second vial holders are symmetrically arranged side-by-side within said housing.

13. The vial manipulator according to claim 1, wherein the vial manipulator constitutes a part of a robotic pharmaceutical preparation system which further comprises an operational module which is configured to interface with a vial assembly held by the vial manipulator, and the controller is further configured to control the operational module.

14. The vial manipulator according to claim 13, wherein the operational module comprises an articulable arm, the vial manipulator being spatially located such that only one of the first and second vial holders is positioned within a range of reach of the arm, whilst the other vial holder is out of the range of reach.

15. A robotic pharmaceutical preparation system, comprising:

a vial manipulator comprising:

a manipulator body, a first vial holder configured to receive and maintain hold of a vial assembly, the first vial holder being pivotably coupled to the manipulator body, and a first pivoting mechanism configured for pivoting the first vial holder, a second vial holder configured to receive and maintain hold of a vial assembly, the second vial holder being pivotably coupled to the manipulator body, and a second pivoting mechanism configured for pivoting the second vial holder;

a fluid communication component configured for interfacing with the vial assembly; and a controller configured to control the first and second pivoting mechanism so as to simultaneously:

(a) pivot the first vial holder to assume the following states:

a first state in which the vial assembly held by the first vial holder is in an upright orientation in which fluid communication is established with the fluid communication component for insertion of fluid by the fluid communication component;

a second state in which the vial assembly held by the first vial holder is in an inverted orientation in which fluid communication is established with the fluid communication component for drawing fluid by the fluid communication component; and (b) either repetitively pivot the second vial holder to agitate the vial assembly, or hold the second vial holder steady.

16. The system according to claim 15, wherein the controller is configured to bring the fluid communication component and the vial assembly held by the first vial holder into vertical alignment.

* * * * *